(12) United States Patent
Koo et al.

(10) Patent No.: US 12,537,952 B2
(45) Date of Patent: Jan. 27, 2026

(54) LOW-FREQUENCY NON-SEPARABLE TRANSFORM DESIGN METHOD AND DEVICE

(71) Applicant: LG Electronics Inc., Seoul (KR)

(72) Inventors: Moonmo Koo, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 51 days.

(21) Appl. No.: 18/286,683

(22) PCT Filed: Apr. 12, 2022

(86) PCT No.: PCT/KR2022/005284
§ 371 (c)(1),
(2) Date: Oct. 12, 2023

(87) PCT Pub. No.: WO2022/220545
PCT Pub. Date: Oct. 20, 2022

(65) Prior Publication Data
US 2024/0205401 A1 Jun. 20, 2024

Related U.S. Application Data

(60) Provisional application No. 63/174,024, filed on Apr. 12, 2021.

(51) Int. Cl.
*H04N 19/12* (2014.01)
*H04N 19/124* (2014.01)
(Continued)

(52) U.S. Cl.
CPC ........... *H04N 19/12* (2014.11); *H04N 19/124* (2014.11); *H04N 19/167* (2014.11);
(Continued)

(58) Field of Classification Search
CPC .... H04N 19/12; H04N 19/124; H04N 19/126; H04N 19/132; H04N 19/167;
(Continued)

(56) References Cited

U.S. PATENT DOCUMENTS

| | | |
|---|---|---|
| 5,381,275 A | 1/1995 | Nitta et al. |
| 2003/0086127 A1* | 5/2003 | Ito ..................... G06K 15/1852 358/462 |

(Continued)

FOREIGN PATENT DOCUMENTS

| | | |
|---|---|---|
| DE | 3029190 A1 | 3/1982 |
| WO | 2020/251332 A1 | 12/2020 |

OTHER PUBLICATIONS

Bross et al., "Versatile Video Coding (Draft 6)," JVET-O2001-vD, Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pages.

(Continued)

*Primary Examiner* — Peter D Le
(74) *Attorney, Agent, or Firm* — Fish & Richardson P.C.

(57) ABSTRACT

According to the disclosure of the present document, a quantization parameter for a quantized transform coefficient present at a DC position within a current block can have the smallest value among quantization parameters which are applied to quantized transform coefficients within the current block, on the basis that an LFNST is applied to the current block. Therefore, coding performance capable of being brought by the LFNST can be maximized within the implementation complexity permitted in forthcoming standards.

11 Claims, 9 Drawing Sheets

(51) Int. Cl.
*H04N 19/167* (2014.01)
*H04N 19/176* (2014.01)
*H04N 19/18* (2014.01)
*H04N 19/60* (2014.01)

(52) U.S. Cl.
CPC ........... *H04N 19/176* (2014.11); *H04N 19/18* (2014.11); *H04N 19/60* (2014.11)

(58) Field of Classification Search
CPC ...... H04N 19/176; H04N 19/18; H04N 19/60; H04N 19/61; H04N 19/70
See application file for complete search history.

(56) References Cited

U.S. PATENT DOCUMENTS

| | | | |
|---|---|---|---|
| 2007/0133889 A1* | 6/2007 | Horie | H04N 19/176 375/E7.199 |
| 2020/0304794 A1 | 9/2020 | Lai et al. | |
| 2021/0092408 A1* | 3/2021 | Ramasubramonian | H04N 19/33 |
| 2021/0136415 A1* | 5/2021 | Hashimoto | H04N 19/186 |
| 2021/0352326 A1* | 11/2021 | Lim | H04N 19/176 |
| 2022/0210451 A1* | 6/2022 | Jung | H04N 19/174 |
| 2022/0321885 A1 | 10/2022 | Lim et al. | |
| 2024/0031607 A1* | 1/2024 | Naser | H04N 19/60 |

OTHER PUBLICATIONS

Extended European Search Report in European Appln. No. 22788401.2, mailed on Mar. 7, 2025, 8 pages.
Ramasubramonian et al., "AHG15: Scaling matrices for LFNST-coded blocks," JVET-P0365-v2, Joint Video Experts Team (JVET) of ITU-T SG 16 WP 3 and ISO/IEC JTC 1/SC 29/WG 11, 16th Meeting: Geneva, CH, Oct. 1-11, 2019, 3 pages.

* cited by examiner (a)

(b)

LOW-FREQUENCY NON-SEPARABLE TRANSFORM DESIGN METHOD AND DEVICE

CROSS-REFERENCE TO RELATED APPLICATIONS

This application is a National Stage application under 35 U.S.C. § 371 of International Application No. PCT/KR2022/005284, filed on Apr. 12, 2022, which claims the benefit of U.S. Provisional Application No. 63/174,024, filed on Apr. 12, 2021. The disclosures of the prior applications are incorporated by reference in their entirety.

TECHNICAL FIELD

The present disclosure relates to video/image coding technology, and more particularly, to a method for performing quantization and scaling based on a low-frequency non-separable transform (LFNST) being applied in a video or image coding system.

RELATED ART

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

An exemplary embodiment of the present disclosure provides a method and an apparatus for enhancing video/image coding efficiency.

An exemplary embodiment of the present disclosure provides an image coding method and an apparatus applying LFNST.

An exemplary embodiment of the present disclosure provides an image coding method and an apparatus performing quantization based on LFNST being applied.

An exemplary embodiment of the present disclosure provides an image coding method and an apparatus configuring a quantization parameter value according to the position of a coeffcieint to which quantization is applied based on LFNST being applied.

An exemplary embodiment of the present disclosure provides an image coding method and an apparatus performing scaling based on LFNST being applied.

An exemplary embodiment of the present disclosure provides an image coding method and an apparatus determining whether to apply scaling list data based on LFNST being applied.

An exemplary embodiment of the present disclosure provides a video/image decoding method performed by a decoding apparatus.

An exemplary embodiment of the present disclosure provides a decoding apparatus for performing a video/image decoding.

An exemplary embodiment of the present disclosure provides a video/image encoding method performed by an encoding apparatus.

An exemplary embodiment of the present disclosure provides an encoding apparatus for performing video/image encoding.

An exemplary embodiment of the present disclosure provides a computer readable digital storage medium in which encoded video/image information generated by the video/image encoding method disclosed in at least one of the exemplary embodiments of the present disclosure is stored.

An exemplary embodiment of the present disclosure provides a computer readable digital storage medium in which encoded information or encoded video/image information causing the video/image decoding method disclosed in at least one of the exemplary embodiments of the present disclosure to be performed by the decoding apparatus is stored.

An exemplary embodiment of the present disclosure provides a method of transmitting video/image data including a bitstream generated based on the video/image encoding method disclosed in at least one of the embodiments of this disclosure.

An exemplary embodiment of the present disclosure can increase overall video/image compression efficiency.

An exemplary embodiment of the present disclosure can apply LFNST.

An exemplary embodiment of the present disclosure can perform quantization based on LFNST being applied.

An exemplary embodiment of the present disclosure can configure a quantization parameter value according to the position of a coefficient to which quantization is applied based on LFNST being applied.

An exemplary embodiment of the present disclosure can perform scaling based on LFNST being applied.

An exemplary embodiment of the present disclosure can determine whether to apply scaling list data based on LFNST being applied.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

DETAILED DESCRIPTION

Figure 1:
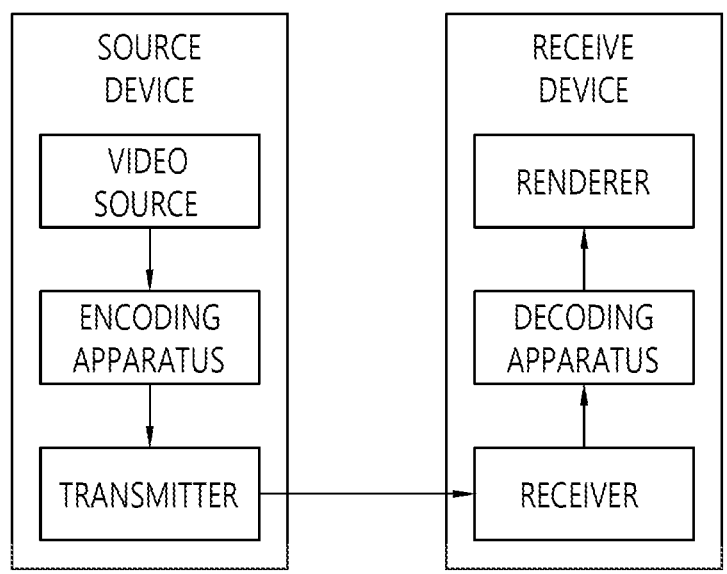
FIG. 1 schematically illustrates an example of a video/image coding system to which exemplary embodiments of the present disclosure are applicable.

This disclosure may be modified in various forms, and specific embodiments thereof will be described and shown in the drawings. However, the embodiments are not intended for limiting this disclosure. The terms used in the following description are used to merely describe specific embodiments, but are not intended to limit this disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this disclosure without departing from the spirit of this disclosure.

Hereinafter, exemplary embodiments of this disclosure will be described in detail with reference to the accompanying drawings. Hereinafter, the same reference numerals are used for the same components in the drawings, and redundant description of the same components may be omitted.

FIG. 1 schematically illustrates an example of a video/image coding system to which exemplary embodiments of the present disclosure are applicable.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present disclosure relates to a video/image coding. For example, methods/exemplary embodiments disclosed in the present disclosure are applicable to a method disclosed in a versatile video coding (VVC) standard. Further, the methods/exemplary embodiments disclosed in the present disclosure are applicable to a method disclosed in an essential video coding (EVC) standard, an AOMedia Video 1 (AV1) standard, a 2nd generation of audio video coding (AVS2) standard, or a next-generation video/image coding standard (e.g., H.267 or H.268).

This disclosure presents various embodiments of video/image coding, and the embodiments may be performed in combination with each other unless otherwise mentioned.

In the present disclosure, a video may mean a group of a series of images over time. A picture generally means a unit representing one image in a specific time period, and a slice and a tile are units constituting a part of a picture in coding. The slice/tile may include one or more coding tree units (CTUs). One picture may be composed of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex., Cb, cr) blocks. The unit may be used interchangeably with terms such as block or area in some cases. In a general case, an M×N block may include samples (or sample arrays) or a set (or array) of transform coefficients of M columns and N rows.

In the present disclosure, "A or B" may mean "only A", "only B", or "both A and B". In other words, in the present disclosure, "A or B" may be interpreted as "A and/or B". For example, in the present disclosure, "A, B, or C" may mean "only A", "only B", "only C", or "any combination of A, B, and C".

A slash (/) or a comma used in the present disclosure may mean "and/or". For example, "A/B" may mean "A and/or B". Therefore, "A/B" may mean "only A", "only B", or "both A and B". For example, "A, B, C" may mean "A, B, or C".

In the present disclosure, "at least one of A and B" may mean "only A", "only B", or, "both A and B". Further, in the present disclosure, expressions of "at least one of A or B" or "at least one of A and/or B" may be interpreted the same as "at least one of A and B".

Further, in the present disclosure, "at least one of A, B, and C" may mean "only A", "only B", "only C", or "any combination of A, B, and C". Further, "at least one of A, B, or C" or "at least one of A, B, and/or C" may mean "at least one of A, B, and C".

Further, a parenthesis used in the present disclosure may mean "for example". Specifically, if it is indicated by a "prediction (intra prediction)", an "intra prediction" may be proposed as an example of the "prediction". In other words, the "prediction" in the present disclosure is not limited to the "intra prediction", and the "intra prediction" may be proposed as the example of the "prediction". Further, even if it is indicated by a "prediction (i.e., intra prediction)", the "intra prediction" may be proposed as the example of the "prediction".

In the present disclosure, a technical feature individually described in one drawing may also be individually implemented, and also be simultaneously implemented.

Figure 2:
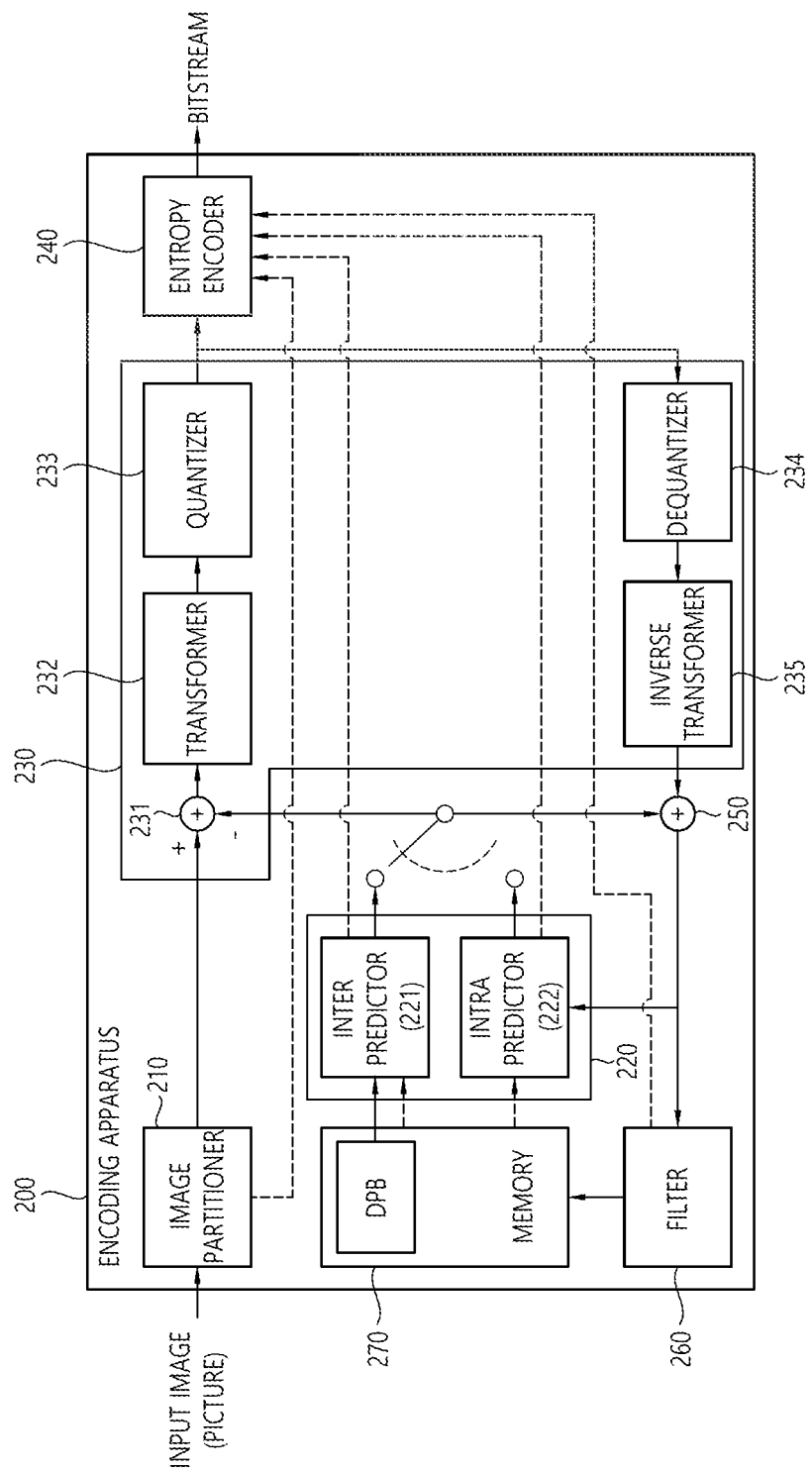
FIG. 2 is a diagram for schematically explaining a configuration of a video/image encoding apparatus to which the exemplary embodiments of the present disclosure are applicable.

FIG. 2 is a diagram for schematically explaining a configuration of a video/image encoding apparatus to which exemplary embodiments of the present disclosure are applicable. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode being applied to the current block by using a prediction mode being applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. Encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
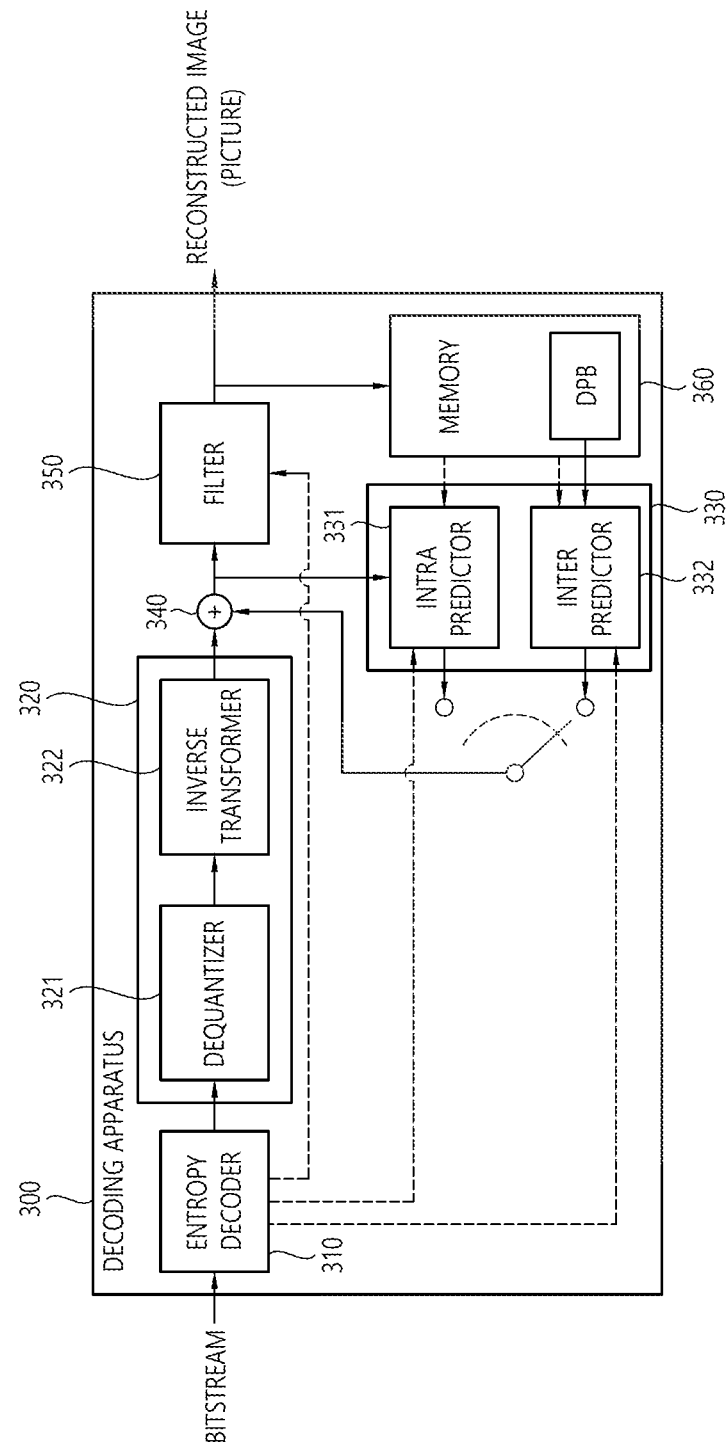
FIG. 3 is a diagram for schematically explaining a configuration of a video/image decoding apparatus to which the exemplary embodiments of the present disclosure are applicable.

FIG. 3 is a diagram schematically explaining a configuration of a video/image decoding apparatus to which exemplary embodiments of the present disclosure are applicable. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor being applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor 330 may perform prediction on the current block and generate a predicted block including prediction samples for the current block. The predictor 330 may determine whether intra prediction or inter prediction is applied to the current block based on the information on the prediction output from the entropy decoder 310 and may determine a specific intra/inter prediction mode.

The predictor 330 may generate a prediction signal based on various prediction methods described below. For example, the predictor 330 may not only apply intra prediction or inter prediction to predict one block but also simultaneously apply intra prediction and inter prediction. This may be called combined inter and intra prediction (CIIP). In addition, the predictor 330 may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode being applied to the current block by using a prediction mode being applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode being applied to the current block by using the prediction mode being applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block:

The adder 340 may generate a reconstructed signal (reconstructed picture, reconstructed block, reconstructed sample array) by adding the obtained residual signal to the prediction signal (predicted block, prediction sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 332 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In this disclosure, the embodiments described in the filter 260, the inter predictor 221, and the intra predictor 222 of the encoding apparatus 200 may be the same as or may be respectively applied to correspond to the filter 350, the inter predictor 332, and the intra predictor 331 of the decoding apparatus 300. The same may also apply to the inter predictor 332 and the intra predictor 331.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present disclosure, at least one of the quantization/the dequantization and/or the transform/the inverse transform may be omitted. If the quantization/dequantization is omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient.

Further, in the present disclosure, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present disclosure.

Meanwhile, intra prediction may indicate prediction for generating prediction samples for a current block based on reference samples within a picture to which the current block belongs (hereinafter referred to as current picture). When intra prediction is applied to the current block, neighboring reference samples to be used for intra prediction of the current block may be derived. The neighboring reference samples of the current block include a total of 2×nH samples adjacent to the left boundary and neighboring the bottom-left of the current block of size nW×nH, a total of 2×nW samples adjacent to the top boundary and neighboring the top-right of the current block, and 1 sample neighboring the top-left of the current block. Alternatively, the neighboring reference samples of the current block may include a plurality of columns of top neighboring samples and a plurality of rows of left neighboring samples. In addition, the neighboring reference samples of the current block include a total of nH samples adjacent to the right boundary of the current block of size nW×nH, a total of nW samples adjacent to the bottom boundary of the current block, and 1 sample neighboring the bottom-right of the current block.

However, some of the neighboring reference samples of the current block may not be decoded yet or may not be available. In this case, the decoder may construct neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of the neighboring reference samples of the current block, or (ii) a prediction sample may be derived based on a reference sample existing in a specific (prediction) direction with respect to the prediction sample among the neighboring reference samples of the current block. Case (i) may be called a non-directional mode or non-angular mode, and case (ii) may be called a directional mode or angular mode.

In addition, the prediction samples may be generated through interpolation between a first neighboring sample located in the prediction direction of the intra prediction mode of the current block with respect to the prediction sample of the current block among the neighboring reference samples and a second neighboring sample located in the opposite direction to the prediction direction. The above case may be called linear interpolation intra prediction (LIP). Also, chroma prediction samples may be generated based on luma samples using a linear model (LM). This case may be called an LM mode or a chroma component LM (CCLM) mode.

In addition, a temporary prediction sample of the current block is derived based on the filtered neighboring reference samples, and then the prediction sample may be derived by weighted summing the temporary prediction sample and at least one reference sample derived according to the intra prediction mode among existing neighboring reference samples, that is, unfiltered neighboring reference samples. The above case may be called position dependent intra prediction (PDPC).

In addition, the intra prediction encoding may be performed through a method of selecting a reference sample line having the highest prediction accuracy among multiple reference sample lines adjacent to the current block, and deriving a prediction sample using a reference sample located in a prediction direction in the corresponding line, and at this time, instructing (signaling) the used reference sample line to the decoding apparatus. The above case may be referred to as multi-reference line intra prediction or MRL-based intra prediction.

In addition, intra prediction may be performed based on the same intra prediction mode by dividing the current block into vertical or horizontal sub-partitions, but the neighboring reference samples may be derived and used in units of sub-partitions. That is, in this case, the intra-prediction mode for the current block is equally applied to the sub-partitions, but intra-prediction performance can be improved in some cases by deriving and using neighboring reference samples in units of sub-partitions. This prediction method may be called intra prediction based on intra sub-partitions (ISP).

The aforementioned intra prediction methods may be referred to as an intra prediction type to be distinguished from the intra prediction mode. The intra prediction type may be called various terms such as an intra prediction technique or an additional intra prediction mode. For example, the intra prediction type (or additional intra prediction mode, etc.) may include at least one of the aforementioned LIP, PDPC, MRL or ISP. A general intra prediction method excluding specific intra prediction types such as LIP, PDPC, MRL, and ISP may be referred to as a normal intra prediction type. The normal intra prediction type may be generally applied when the specific intra prediction type as described above is not applied, and the prediction may be performed based on the aforementioned intra prediction mode. Meanwhile, post-processing filtering may be performed on the derived prediction sample as needed.

Relatedly, the above-described intra prediction modes may include two non-directional intra prediction modes and 65 directional prediction modes. The non-directional intra prediction modes may include a planar intra prediction mode and a DC intra prediction mode, and the directional intra prediction modes may include intra prediction modes numbered 2 to 66.

Figure 4:
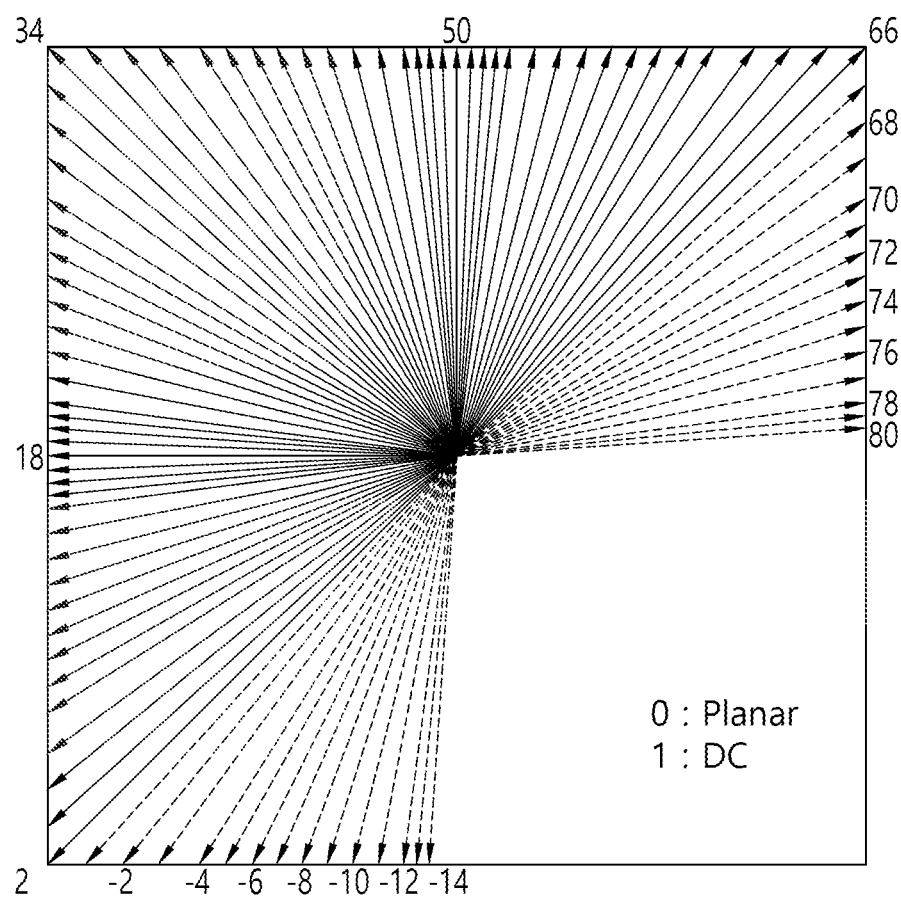
FIG. 4 exemplarily illustrates intra prediction modes applicable to embodiments of the present disclosure.

FIG. 4 exemplarily illustrates intra prediction modes applicable to embodiments of the present disclosure.

Referring to FIG. 4, it is possible to distinguish between intra prediction modes having horizontal directionality and intra prediction modes having vertical directionality centering on intra prediction mode 34 having an upward-left diagonal prediction direction. That is, intra prediction modes 2 to 33 have a horizontal direction, and intra prediction modes 34 to 66 have a vertical direction. The intra prediction mode 18 and the intra prediction mode 50 represent a horizontal intra prediction mode and a vertical intra prediction mode, respectively, the intra prediction mode 2 may represent a downward-left diagonal intra prediction mode, the intra prediction mode 34 may represent an top-left diagonal intra prediction mode, and the intra prediction mode 66 may represent an top-left diagonal intra prediction mode. The non-directional intra prediction modes may include a planar intra prediction mode of mode number 0 and a DC intra prediction mode of mode number 1.

Figure 5:
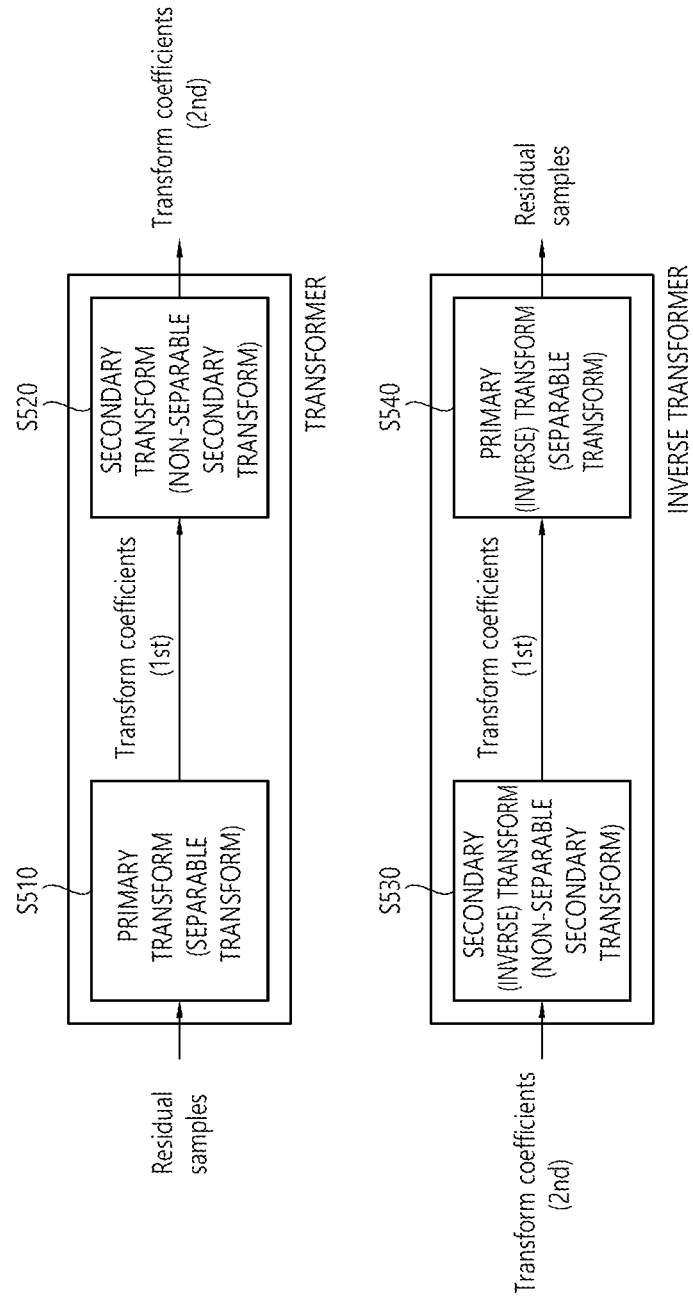
FIG. 5 schematically illustrates a transform technique according to an embodiment of this disclosure.

FIG. 5 schematically illustrates a transform technique according to an embodiment of the present disclosure.

Referring to FIG. 5, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S510). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the DCT type 2, the DST type 7, the DCT type 8, and the DST type 1 may be called a transform type, transform kernel or transform core. These DCT/DST transform types can be defined based on basis functions.

When the multiple core transform is performed, a vertical transform kernel and a horizontal transform kernel for a target block may be selected from among the transform kernels, a vertical transform may be performed on the target block based on the vertical transform kernel, and a horizontal transform may be performed on the target based on the horizontal transform kernel. Here, the horizontal transform may indicate a transform on horizontal components of the target block, and the vertical transform may indicate a transform on vertical components of the target block.

According to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trType Ver value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trType Ver values are 1, an MTS index of 2 may indicate that the trTypeHor value is 2 and the trTypeVer value. Is 1, an MTS index of 3 may indicate that the trTypeHor value is 1 and the trType Ver value is 2, and an MTS index of 4 may indicate that both both trTypeHor and trTypeVer values are 2.

In one example, transform kernel sets according to MTS index information are illustrated in the following table.

TABLE 1

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S520). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST).

The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. For example, in case of the non-separable secondary transform, two-dimensional signals (transform coefficients) are re-arranged to a one-dimensional signal through a certain determined direction (e.g., row-first direction or column-first direction), and then modified transform coefficients (or secondary transform coefficients) are derived based on the matrix operation between this one-dimensional vector and the non-separable transform matrix.

For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. That is, for the non-separable secondary transform, the transform coefficients derived through the primary transform may be arranged in a one-dimensional vector according to the row-first order direction and then, the matrix operation may be performed to the transform coefficients, or arranged in a one-dimensional vector according to the column-first order direction, and then, the matrix operation may be performed to the transform coefficients.

The non-separable secondary transform may be applied to a top-left region of a block configured with (primary) transform coefficients (hereinafter, may be referred to as a transform coefficient block or a transform block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min (8, W)×min (8, H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min (8, W)×min (8,H) region of the transform coefficient block. In summary, the non-separable secondary transform may be applied to a 4×4 or 8×8 region at the top-left of the transform block according to the size of the transform block. According to an example, the transform for the top-left 4×4 region may be named a 4×4 transform, and the transform for the top-left 8×8 region may be referred to as an 8×8 transform.

Here, to select a transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform, may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and may represent a non-separable transform for a low frequency component.

According to an example, the four transform sets according to the intra prediction mode may be mapped, for example, as shown in the following table 2.

TABLE 2

| IntraPredMode | Tr. set index |
|---|---|
| intraPredMode < 0 | 1 |
| 0 <= IntraPredMode <= 1 | 0 |
| 2 <= intraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

As shown in Table 2, the intra prediction modes may be mapped to any one of four transform sets, that is, IfnstTrSetIdx may be mapped to any one among from 0 to 3.

On the other hand, when it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, Ifnst index value 1 may refer to a second non-separable secondary transform kernel, and Ifnst index value 2 may refer to a third non-separable secondary transform kernel. Alternatively, Ifnst index value 0 may indicate that the first non-separable secondary transform is not applied to the target block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S530), and may obtain a residual block (residual samples) by performing a primary (inverse) transform on the (primary) transform coefficients (S540). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The inverse transformer may derive the modified transform coefficients by applying a transform kernel matrix to transformed (inverse quantized) transform coefficients arranged in a specific order, for example, in a diagonal scan order (specifically, a diagonal scan order starting from the top left corner of the transform block and proceeding in the bottom right direction). The modified transform coefficients may be arranged in two dimensions in the top left region of the transform block according to the direction in which the transform coefficients are scanned for the secondary transform in the transformer, that is, the row-first direction or the column-first direction. When the transformer performs the 4×4 transform, the inverse transformer may arrange the modified transform coefficients in two dimensions in the 4×4 region of the transform block, and when the transformer performs the 8×8 transform, the inverse transformer may arrange the modified transform coefficients in two dimensions in the 8×8 region of the transform block.

Meanwhile, the secondary inverse transform may be NSST, reduced secondary transform (RST) or LFNST, and whether to apply the secondary inverse transform may be determined based on a secondary transform flag parsed from a bitstream. As another example, whether to apply the secondary inverse transform may be determined based on transform coefficients of the residual block.

This secondary inverse transform (i.e. transform kernel, transform matrix or transform kernel matrix) may be determined based on the LFNST (NSST or RST) transform set specified according to the intra prediction mode. Also, as an embodiment, the secondary transform determination method may be determined depending on the primary transform determination method. Depending on the intra prediction mode, various combinations of primary transform and secondary transform may be determined. Also, for example, a region to which a secondary inverse transform is applied may be determined based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform. In addition, since the RST is mainly performed in a low-frequency region including non-zero coefficients in a transform block, it may be referred to as a low-frequency non-separable transform (LFNST). The transform index may be named LFNST index.

In this disclosure, the LFNST may mean a transform performed on residual samples of a target block based on a transform matrix having a reduced size. When the reduced transform is performed, the amount of computation required for transform may be reduced due to the reduction in the size of the transform matrix. That is, the LFNST can be used to solve the computational complexity issue that occurs when transforming or non-separable transforming a large block.

Meanwhile, when the secondary inverse transform is performed based on LFNST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

Figure 6:
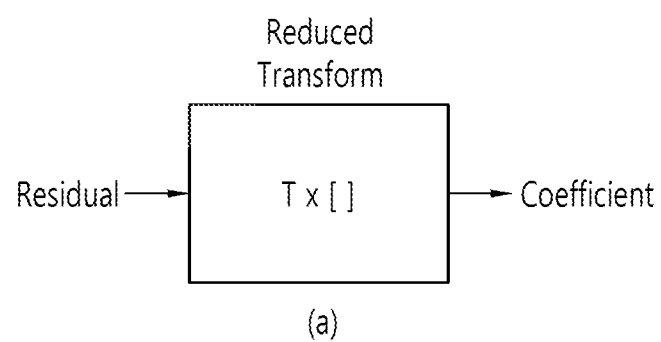
FIG. 6 is a diagram for explaining RST according to an embodiment of the present disclosure.
Figure 6:
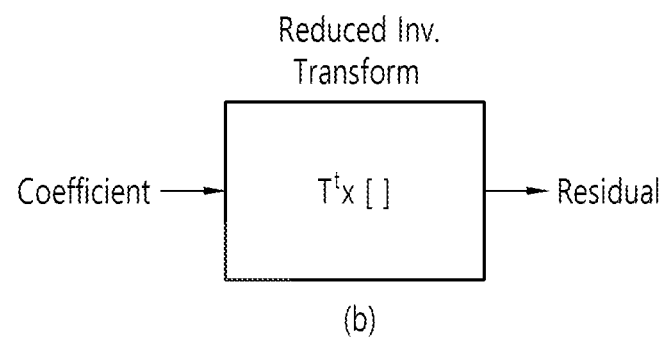

FIG. 6 is a diagram illustrating an RST or an LFNST applied to the RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, reduced factor, simple factor or other various terms. Meanwhile, R may be referred to as a reduced coefficient, but according to circumstances, the reduced factor may mean R. Further, according to circumstances, the reduced factor may mean the N/R value.

The size of the reduced transform matrix according to an example may be R×N less than N×N, the size of a conventional transform matrix, and may be defined as in Equation 1 below.

$$T_{R \times N} = \begin{bmatrix} t_{11} & t_{12} & t_{13} & \cdots & t_{1N} \\ t_{21} & t_{22} & t_{23} & & t_{2N} \\ \vdots & & \ddots & & \vdots \\ t_{R1} & t_{R2} & t_{R3} & \cdots & t_{RN} \end{bmatrix}$$

[Equation 1]

The matrix T in the Reduced Transform block shown in (a) of FIG. 6 may mean the matrix $T_{R \times N}$ of Equation 1. As shown in (a) of FIG. 6, when the reduced transform matrix $T_{R \times N}$ is multiplied to residual samples for the target block, transform coefficients for the target block may be derived.

In an example, if the size of the block to which the transform is applied is 8×8 and R=16 (i.e., R/N=16/64=¼), then the RST according to (a) of FIG. 6 may be expressed as a matrix operation as shown in Equation 2 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ \vdots & & \ddots & & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix}$$

[Equation 2]

In Equation 2, $r_1$ to $r_{64}$ may represent residual samples for the target block and may be specifically transform coefficients generated by applying a primary transform. As a result of the calculation of Equation 2 transform coefficients ci for the current block may be derived, and a process of deriving ci may be as in Equation 3.

```
for i from to R:
    ci = 0
    for j from 1 to N
        ci += tij * rj
```
[Equation 3]

As a result of the calculation of Equation 3, transform coefficients $c_1$ to $c_R$ for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the LFNST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix TN×R according to an example is N×R less than the size N×N of the regular inverse transform matrix, and is in a transpose relationship with the reduced transform matrix $T_{R \times N}$ shown in Equation 1.

The matrix $T^t$ in the Reduced Inv. Transform block shown in (b) of FIG. 6 may mean the inverse RST matrix $T_{R \times N}^T$ (the superscript T means transpose). When the inverse RST matrix $T_{R \times N}^T$ is multiplied to the transform coefficients for the target block as shown in (b) of FIG. 6, the modified transform coefficients for the target block or the residual samples for the target block may be derived. The inverse RST matrix $T_{R \times N}^T$ may be expressed as $(T_{R \times N})^T_{N \times R}$.

More specifically, when the inverse RST is applied as the secondary inverse transform, the modified transform coefficients for the target block may be derived when the inverse RST matrix $T_{R \times N}^T$ is multiplied to the transform coefficients for the target block.

Meanwhile, according to an example, the inverse RST may be applied as the inverse primary transform, and in this case, the residual samples for the target block may be derived when the inverse RST matrix $T_{R \times N}^T$ is multiplied to the transform coefficients for the target block.

In an example, if the size of the block to which the inverse transform is applied is 8×8 and R=16 (i.e., R/N=16/64=¼), then the RST according to (b) of FIG. 6 may be expressed as a matrix operation as shown in Equation 4 below.

$$\begin{bmatrix} t_{1,1} & t_{2,1} & & t_{16,1} \\ t_{1,2} & t_{2,2} & \cdots & t_{16,2} \\ t_{1,3} & t_{2,3} & & t_{16,3} \\ \vdots & \vdots & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix}$$

[Equation 4]

In Equation 4, $c_1$ to $c_{16}$ may represent transform coefficients of the target block, that is, transform coefficients derived through residual coding. As a result of the operation of Equation 4, $r_i$ representing modified transform coefficients of the target block or residual samples of the target block may be derived, and the derivation process of $r_i$ may be the same as Equation 5.

$$\begin{array}{l} \text{for } i \text{ from 1 to } N \\ \quad r_i = 0 \\ \quad \text{for } j \text{ from 1 to } R \\ \qquad r_i \mathrel{+}= t_{ji} * c_j \end{array} \qquad \text{[Equation 5]}$$

As a result of the operation of Equation 5, $r_1$ to $r_N$ indicating modified transform coefficients of the target block or residual samples of the target block may be derived. Since N is 64 in Equation 4, 64 modified transform coefficients can be derived through Equation 5.

Considering the size of the inverse transform matrix, the size of the normal inverse transform matrix is 64×64 (N×N), but the size of the reduced inverse transform matrix is reduced to 64×16 (N×R), and compared to performing the normal inverse transform, the memory usage can be reduced by R/N ratio when performing the inverse RST. In addition, compared to the number of multiplication operations N×N when using the normal inverse transform matrix, the number of multiplication operations can be reduced by an R/N ratio (N×R) when a reduced inverse transform matrix is used. A reduced inverse transform matrix or inverse transform matrix may also be named a reduced transform matrix or a transform matrix if it is not confusing whether it is a transform or an inverse transform.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients.

That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. In this embodiment, the column vectors of Equation 2 are r1 to r48, the size of the transform matrix is 16×48, and 16 modified transform coefficients (c1 to c16) are derived through matrix operation.

At this time, a 48×1 vector can be configured by appropriately arranging 48 pieces of data constituting an 8×8 region. For example, a 48×1 vector may be constructed based on 48 pieces of data constituting a region excluding the 4×4 region at the bottom right of the 8×8 region. At this time, when matrix operation is performed by applying the maximum 16×48 transform kernel matrix, 16 modified transform coefficients are generated. The 16 modified transform coefficients can be arranged in the top left 4×4 region according to the scanning order, and the top right 4×4 region and the bottom left 4×4 region can be filled with zeros.

For the inverse transform of the decoding process, a transposed matrix of the transform kernel matrix described above may be used. That is, when inverse RST or inverse LFNST is performed as an inverse transform process performed by the decoding apparatus, the input coefficient data to which the inverse RST is applied is composed of a 1-dimensional vector according to a predetermined arrangement order (diagonal scanning order), and the modified coefficient vector obtained by multiplying the 1-dimensional vector by the corresponding inverse RST matrix from the left side may be arranged in a 2-dimensional block according to a predetermined arrangement order.

If RST or LFNST is performed in the 8×8 region and inverse RST or inverse LFNST is performed, the size of the transform matrix of Equation 4 is 48×16, the column vector includes $c_1$ to $c_{16}$, and 48 modified transform coefficients ($r_1$ to $r_{48}$) are derived through the matrix operation.

In summary, in the transform process performed by the encoding apparatus, when RST or LFNST is applied to the 8×8 region, the matrix operation of the 48 transform coefficients of the top left, top right, and bottom left regions of the 8×8 region excluding the bottom right region of the 8×8 region among the transform coefficients of the 8×8 region and the 16×48 transform kernel matrix is performed. For the matrix operation, the 48 transform coefficients are input as a one-dimensional array. When this matrix operation is performed, 16 modified transform coefficients are derived, and the 16 modified transform coefficients may be arranged in the top left region of the 8×8 region.

Conversely, in the inverse transform process performed by the encoding apparatus or the decoding apparatus, when the inverse RST or LFNST is applied to the 8×8 region, 16 transform coefficients at the top left of the 8×8 region among the transform coefficients of the 8×8 region may be input in the form of a 1-dimensional array according to a scanning order and subjected to matrix operation with a 48×16 transform kernel matrix. That is, the matrix operation in this case can be expressed as (48×16 matrix)*(16×1 transform coefficient vector)=(48×1 modified transform coefficient vector). Here, since the n×1 vector can be interpreted in the same sense as an n×1 matrix, it can also be expressed as an n×1 column vector. Also, * means matrix multiplication operation. When this matrix operation is performed, the 48 modified transform coefficients can be derived, and the 48 modified transform coefficients can be arranged in the top left, top right, and bottom left regions of the 8×8 region except for the bottom right region.

Meanwhile, as described above, the quantizer of the encoding apparatus may derive quantized transform coefficients by applying quantization to transform coefficients. The dequantizer of the encoding apparatus or the dequantizer of the decoding apparatus may derive transform coefficients by applying dequantization to the quantized transform coefficients.

In general, in video/image coding, a quantization ratio may be changed, and a compression rate may be adjusted using the changed quantization ratio. In an implementation aspect, a quantization parameter (QP) may be used instead of directly using the quantization ratio by considering complexity. For example, quantization parameters having integer values of 0 to 63 may be used, and each quantization parameter value may correspond to an actual quantization ratio. Furthermore, for example, a quantization parameter QPY for a luma component and a quantization parameter QPC for a chroma component may be different configured.

In a quantization process, a transform coefficient C may be an input, a quantization ratio (Qstep) may be divided, and a quantized transform coefficient C' may be obtained based on the quantization ratio. In this case, the quantization ratio may be produced in an integer form by multiplying the quantization ratio by a scale by considering calculation complexity, and a shift operation may be performed by a value corresponding to a scale value. A quantization scale may be derived based on the product of the quantization ratio and the scale value. That is, the quantization scale may be derived based on the QP. For example, the quantization scale may be applied to the transform coefficient C', and a quantized transform coefficient C' may be derived based on a result of the application.

A dequantization process is a reverse process of the quantization process. In this process, a quantized transform coefficient C' may be multiplied by a quantization ratio (Qstep), and a reconstructed transform coefficient C" may be obtained based on the result of the multiplication. In this case, a level scale may be derived based on a quantization parameter, the level scale may be applied to the quantized transform coefficient C', and a reconstructed transform coefficient C" may be derived. The reconstructed transform coefficient C" may have some difference from the first transform coefficient C due to a loss in the transform and/or quantization process. Accordingly, dequantization is performed in the encoding apparatus as in the decoding apparatus.

Meanwhile, an adaptive frequency weighting quantization technology for adjusting quantization strength depending on a frequency may be applied. The adaptive frequency weighting quantization technology is a method of differently applying quantization strength for each frequency. In the adaptive frequency weighting quantization, quantization strength for each frequency may be differently applied using a predefined quantization scaling matrix. That is, the aforementioned quantization/dequantization process may be performed based on the quantization scaling matrix. For example, in order to generate the size of a current block and/or a residual signal of the current block, a different quantization scaling matrix may be used depending on whether a prediction mode applied to the current block is inter prediction or intra prediction. The quantization scaling matrix may be called a quantization matrix or a scaling matrix. The quantization scaling matrix may be pre-defined. Furthermore, for frequency adaptive scaling, quantization scale information for each frequency for the quantization scaling matrix may be constructed/encoded in the encoding apparatus and signaled to the decoding apparatus. The quantization scale information for each frequency may be called quantization scaling information. The quantization scale information for each frequency may include scaling list data (scaling_list_data). A (modified) quantization scaling matrix may be derived based on the scaling list data. Furthermore, the quantization scale information for each frequency may include present flag information representing whether the scaling list data is present. Alternatively, if the scaling list data is signaled in a higher level (e.g., SPS), information representing whether the scaling list data is modified in a lower level (e.g., a PPS or a tile group header, etc.) of a higher level, etc. may be further included.

As in the aforementioned contents, quantization/dequantization may be applied to a luma component and a chroma component based on a quantization parameter.

Quantization parameters for a coding unit may be determined based on information signaled in a picture and/or a slice level. For example, the quantization parameters may be derived as in contents described later.

For example, information related to the derivation of quantization parameters may be signaled as in the following table through a sequence parameter set (SPS).

TABLE 3

|  | Descriptor |
| --- | --- |
| seq_parameter_set_rbsp( ) { |  |
|   sps_decoding_parameter_set_id | u(4) |
|   ... |  |
|   bit_depth_luma_minus8 | ue(v) |
|   bit_depth_chroma_minus8 | ue(v) |
|   ... |  |
|   rbsp_trailing_bits( ) |  |
| } |  |

Semantics for syntax elements in Table 3 may be the same as the following table.

[Table 4]

TABLE 4 bit_depth_luma_minus8 specifies the bit depth of the samples of the luma array $BitDepth_Y$ and the value of the luma quantization parameter range offset $QpBdOffset_Y$ as follows:
  $BitDepth_Y = 8 + $ bit_depth_luma_minus8
  $QpBdOffset_Y = 6 *$ bit_depth_luma_minus8
bit_depth_luma_minus8 shall be in the range of 0 to 8, inclusive.
bit_depth_chroma_minus8 specifies the bit depth of the samples of the chroma arrays $BitDepth_C$ and the value of the chroma quantization parameter range offset $QpBdOffset_C$ as follows:
  $BitDepth_C = 8 +$ bit_depth_chroma_minus8
  $QpBdOffset_C = 6 *$ bit_depth_chroma_minus8
bit_depth_chroma_minus8 shall be in the range of 0 to 8, inclusive.

For example, the syntax element bit_depth_luma_minus8 may represent BitDepthY, that is, the bit depth of samples of a luma array, and QpBdOffsetY that is a luma quantization parameter range offset. That is, for example, the BitDepthY and the QpBdOffsetY may be derived based on the syntax element bit_depth_luma_minus8. For example, the BitDepthY may be derived as a value obtained by adding 8 to a value of the syntax element bit_depth_luma_minus8. The QpBdOffsetY may be derived as a value obtained by multiplying a value of the syntax element bit_depth_luma_minus8 by 6. Furthermore, the bit_depth_luma_minus8 may be in a range of 0 to 8.

Furthermore, for example, the syntax element bit_depth_chroma_minus8 may represent BitDepthc, that is, the bit depth of samples of a chroma array, and QpBdOffsetc, that is, a chroma quantization parameter range offset. That is, for example, the BitDepthc and the QpBdOffsetc may be derived based on the syntax element bit_depth_chroma_minus8. For example, the BitDepthc may be derived as a value obtained by adding 8 to a value of the syntax element bit_depth_chroma_minus8. The QpBdOffsetc may be derived as a value obtained by multiplying a value of the syntax element bit_depth_chroma_minus8 by 6. Furthermore, the bit_depth_chroma_minus8 may be in a range of 0 to 8.

Furthermore, information related to the derivation of quantization parameters may be signaled as in the following table, for example, through a picture parameter set (PPS). The information may include a chroma Cb offset, a chroma Cr offset, a joint chroma offset, and an initial quantization parameter. That is, the information may include syntax elements for a chroma Cb offset, a chroma Cr offset, a joint chroma offset, and an initial quantization parameter.

TABLE 5

|  | Descriptor |
|---|---|
| pic_parameter_set_rbsp( ) { |  |
|   pps_pic_parameter_set_id | ue(v) |
| ... |  |
|   init_qp_minus26 | se(v) |
|   transform_skip_enabled_flag | u(1) |
|   pps_cb_qp_offset | se(v) |
|   pps_cr_qp_offset | se(v) |
|   pps_joint_cbcr_qp_offset | se(v) |
|   pps_slice_chroma_qp_offsets_present_flag | u(1) |
| ... |  |
|   rbsp_trailing_bits( ) |  |
| } |  |

Semantics for syntax elements in Table 5 may be the same as the following table.

TABLE 6 init_qp_minus26 plus 26 specifies the initial value of SliceQp$_Y$ for each slice referring to the PPS. The initial value of SliceQp$_Y$ is modified at the slice layer when a non-zero value of slice_qp_delta is decoded. The value of init_qp_minus26 shall be in the range of −( 26 + QpBdOffset$_Y$ ) to +37, inclusive.
pps_cb_qp_offset and pps_cr_qp_offset specify the offsets to the luma quantization parameter Qp'$_Y$ used for deriving Qp'$_{Cb}$ and Qp'$_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.
pps_joint_cbcr_qp_offset specifies the offset to the luma quantization parameter Qp'$_Y$ used for deriving Qp'$_{CbCr}$. The value of pps_joint_cbcr_qp_offset shall be in the range of −12 to +12, inclusive. When ChromaArrayType is equal to 0, pps_joint_cbcr_qp_offset is not used in the decoding process and decoders shall ignore its value.
pps_slice_chroma_qp_offsets_present_flag equal to 1 indicates that the slice_cb_qp_offset and slice_cr_qp_offset syntax elements are present in the associated slice headers.
pps_slice_chroma_qp_offsets_present_flag equal to 0 indicates that these syntax elements are not present in the associated slice headers. When ChromaArrayType is equal to 0, pps_slice_chroma_qp_offsets_present_flag shall be equal to 0.

For example, a value obtained by adding 26 to the syntax element init_qp_minus26 may represent an initial value of SliceQpY for each slice that refers to a PPS. If a non-zero value of slice_qp_delta is decoded, an initial value of the SliceQpY may be modified in a slice layer. The init_qp_minus26 0 may be in a range of −(26+QpBdOffsetY) to +37.

Furthermore, for example, syntax elements pps_cb_qp_offset and pps_cr_qp_offset may represent offsets for a luma quantization parameter Qp'Y used to derive Qp'Cb and Qp'Cr, respectively. The pps_cb_qp_offset and pps_cr_qp_offset may be in a range of −12 to +12. Furthermore, when ChromaArrayType is 0, in a decoding process, pps_cb_qp_offset and pps_cr_qp_offset may not be used, and the decoding apparatus may ignore values of the syntax elements.

Furthermore, for example, the syntax element pps_joint_cbcr_qp_offset may represent an offset for a luma quantization parameter Qp'Y used to derive Qp'CbCr. The pps_joint_cbcr_qp_offset may be in a range of −12 to +12. Furthermore, when ChromaArrayType is 0, in a decoding process, pps_joint_cbcr_qp_offset may not be used, and the decoding apparatus may ignore a value of the syntax element.

Furthermore, for example, the syntax element pps_slice_chroma_qp_offsets_present_flag may represent whether syntax elements slice_cb_qp_offset and slice_cr_qp_offset are present in slice headers associated with the syntax elements slice_cb_qp_offset and slice_cr_qp_offset. For example, pps_slice_chroma_qp_offsets_present_flag having a value of 1 may represent that the syntax elements slice_cb_qp_offset and slice_cr_qp_offset are present in slice headers associated with the syntax elements slice_cb_qp_offset and slice_cr_qp_offset. Furthermore, for example, pps_slice_chroma_qp_offsets_present_flag having a value of 0 may represent that the syntax elements slice_cb_qp_offset and slice_cr_qp_offset are not present in slice headers associated with the syntax elements slice_cb_qp_offset and slice_cr_qp_offset. Furthermore, when ChromaArrayType is 0, in a decoding process, pps_slice_chroma_qp_offsets_present_flag may be the same as 0.

As in the aforementioned contents, syntax elements parsed in the PPS may be init_qp_minus26, pps_cb_qp_offset_pps_cr_qp_offset, pps_joint_cbcr_qp_offset, and pps_slice_chroma_qp_offsets_present_flag. A syntax element init_qp_minus26 may represent an initial value of SliceQpY for each slice that refers to a PPS. Furthermore, syntax elements pps_cb_qp_offset, pps_cr_qp_offset, and pps_joint_cbcr_qp_offset may represent offsets for a luma quantization parameter Qp'Y. Furthermore, the syntax element pps_slice_chroma_qp_offsets_present_flag may represent whether an offset parameter is present in a slice header.

Furthermore, information related to the derivation of quantization parameters may be signaled as in the following table through a slice header, for example.

TABLE 7

|  | Descriptor |
|---|---|
| slice_header( ) { |  |
|   slice_pic_parameter_set_id | ue(v) |
| ... |  |
|   slice_qp_delta | se(v) |
|   if( pps_slice_chroma_qp_offsets_present_flag ) { |  |
|     slice_cb_qp_offset | se(v) |
|     slice_cr_qp_offset | se(v) |
|     slice_joint_cbcr_qp_offset | se(v) |
|   } |  |
| ... |  |
|   byte_alignment( ) |  |
| } |  |

Semantics for syntax elements in Table 7 may be the same as the following table.

TABLE 8 slice_qp_delta specifies the initial value of $Qp_Y$ to be used for the coding blocks in the slice until modified by the value of CuQpDeltaVal in the coding unit layer. The initial value of the $Qp_Y$ quantization parameter for the slice, $SliceQp_Y$, is derived as follows:
  $SliceQp_Y$ = 26 + init_qp_minus26 + slice_qp_delta
The value of $SliceQp_Y$ shall be in the range of $-QpBdOffset_Y$ to +63, inclusive.
slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to 0. The value of pps_cb_qp_offset + slice_cb_qp_offset shall be in the range of −12 to +12, inclusive.
slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to 0. The value of pps_cr_qp_offset + slice_cr_qp_offset shall be in the range of −12 to +12, inclusive.
slice_joint_cbcr_qp_offset specifies a difference to be added to the value of pps_joint_cbcr_qp_offset when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset + slice_joint_cbcr_qp_offset shall be in the range of −12 to +12, inclusive.
The derivation process for the luma and chroma quantization parameters begin with the inputs to the process being a luma location, variables specifying the width and height of the current coding block and a variable specifying whether it is a single or a dual tree. The luma, chroma and the joint chroma quantization parameters are dentoted as follows: $Qp'_Y$ $Qp'_{Cb}$ $Qp'_{Cr}$ and $Qp'_{CbCr}$.
  cu_qp_delta_sign_flag specifies the sign of CuQpDeltaVal as follows:
  - If cu_qp_delta_sign_flag is equal to 0, the corresponding CuQpDeltaVal has a positive value.
  - Otherwise (cu_qp_delta_sign_flag is equal to 1), the corresponding CuQpDeltaVal has a negative value.
  When cu_qp_delta_sign_flag is not present, it is inferred to be equal to 0.
  When cu_qp_delta_abs is present, the variables IsCuQpDeltaCoded and CuQpDeltaVal are derived as follows:
    IsCuQpDeltaCoded = 1
    CuQpDeltaVal = cu_qp_delta_abs * ( 1 − 2 * cu_qp_delta_sign_flag )
  The value of CuQpDeltaVal shall be in the range of −( 32 + QpBdOffsetY / 2 ) to +( 31 + QpBdOffsetY / 2 ), inclusive.

For example, slice_qp_delta may represent an initial value of QpY to be used in a coding block within a slice until it is modified by a value of CuQpDeltaVal in a coding unit layer. For example, an initial value of QpY for a slice, SliceQpY, may be derived as 26+init_qp_minus26+ slice_qp_delta. A value of SliceQpY may be in a range of −QpBdOffsetY to +63.

Furthermore, for example, slice_cb_qp_offset may represent a difference to be added to a value of pps_cb_qp_offset when a value of the quantization parameter Qp'Cb is determined. A value of slice_cb_qp_offset may be in a range of −12 to +12. Furthermore, for example, if slice_cb_qp_offset is not present, the slice_cb_qp_offset may be inferred as 0. A value of pps_cb_qp_offset+slice_cb_qp_offset may be in a range of 12 to +12.

Furthermore, for example, slice_cr_qp_offset may represent a difference to be added to a value of pps_cr_qp_offset when a value of a quantization parameter Qp'Cr is determined. A value of slice_cr_qp_offset may be in a range of −12 to +12. Furthermore, for example, if slice_cr_qp_offset is not present, the slice_cr_qp_offset may be inferred as 0. A value of pps_cr_qp_offset+slice_cr_qp_offset may be in a range of 12 to +12.

Furthermore, for example, slice_cbcr_qp_offset may represent a difference to be added to a value of pps_cbcr_qp_offset when a value of a quantization parameter Qp'CbCr is determined. A value of slice_cbcr_qp_offset may be in a range of −12 to +12. Furthermore, for example, if slice_cbcr_qp_offset is not present, the slice_cbcr_qp_off-set may be inferred as 0. A value of pps_cbcr_qp_offset+ slice_cbcr_qp_offset may be in a range of 12 to +12.

A derivation process for luma and chroma quantization parameters may be started based on the fact that an input for the process is a luma location, a parameter to designate the width and height of a current coding block, and a parameter to designate a single tree or a dual tree. Meanwhile, as in the aforementioned contents, a luma quantization parameter, a chroma quantization parameter and a joint chroma quantization parameter may be represented as Qp'Y, Qp'Cb, Qp'Cr and Qp'CbCr.

Meanwhile, for example, the syntax element cu_qp_delta_sign_flag representing a sign of CuQpDelta Val may be parsed. For example, the cu_qp_delta_sign_flag may represent the sign of CuQpDelta Val as follows.

For example, when the cu_qp_delta_sign_flag is 0, CuQpDeltaVal corresponding to the cu_qp_delta_sign_flag may have a positive value. Alternatively, for example, when the cu_qp_delta_sign_flag is 1, CuQpDeltaVal corresponding to the cu_qp_delta_sign_flag may have a negative value. Furthermore, if the cu_qp_delta sign_flag is not present, the cu_qp_delta_sign_flag may be inferred as 0.

Furthermore, for example, if cu_qp_delta_abs is present, a parameter IsCuQpDeltaCoded may be derived as 1. A parameter CuQpDelta Val may be derived as cu_qp_delta_abs*(1-2*cu_qp_delta_sign_flag). The CuQpDelta Val may be in a range of −(32+QpBdOffsetY/2) to + (31+ QpBdOffsetY/2).

Thereafter, for example, the luma quantization parameter Qp'Y may be derived as in the following equation.

$$Qp_Y = ((qP_{Y\_PRED} + CuQpDeltaVal + 64 + 2*QpBdOffset_Y) \% (64 + QpBdOffset_Y)) - QpBdOffset_Y$$ [Equation 6]

Furthermore, if ChromaArrayType is not 0 and, treeType is SINGLE_TREE or DUAL_TREE_CHROMA, the following may be applied.

When treeType is equal to DUAL_TREE_CHROMA, a parameter QpY may be set identically with a luma quantization parameter QpY of a luma coding unit including a luma location (xCb+cbWidth/2, yCb+cbHeight/2).

Parameters qPCb, qPCr and qPCbCr may be derived as follows.

As an example, qPiCb, qPiCr, and qPiCbCr may be derived through Equation 7 below.

$$qPi_{Cb} = \text{Clip3}(-\text{QpBdOffset}_C, 69, Qp_Y + pps\_cb\_qp\_\text{offset} + slice\_cb\_qp\_\text{offset})$$

$$qPi_{Cr} = \text{Clip3}(-\text{QpBdOffset}_C, 69, Qp_Y + pps\_cr\_qp\_\text{offset} + slice\_cr\_qp\_\text{offset})$$

$$qPi_{CbCr} = \text{Clip3}(-\text{QpBdOffset}_C, 69, Qp_Y + pps\_joint\_cbcr\_qp\_\text{offset} + slice\_joint\_cber\_qp\_\text{offset}) \quad [\text{Equation 7}]$$

At this time, for example, when ChromaArrayType is 1, the variables qPCb, qPCr, and qPCbCr may each be set equal to the QpC value specified by the following Table 9 based on the index qPi, where the index qPi may represent qPiCb, qPiCr, and qPiCbCr derived through Equation 7, respectively.

TABLE 9

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_C$ | =qPi | 29 | 30 | 31 | 32 | 33 | 33 | 34 | 34 | 35 | 35 | 36 | 36 | 37 | 37 | =qPi − 6 |

Alternatively, when ChromaArrayType is not 1, the parameters qPCb, qPCr, and qPCbCr may be set identically with Min (qPi, 63) based on the same indices qPi as qPiCb, qPiCr, and qPiCbC, respectively.

-Chroma quantization parameters for a Cb component and a Cr component, Qp'Cb and Qp'Cr, and a chroma quantization parameter Qp'CbCr for joint Cb-Cr coding may be derived as follows.

$$Qp'_{Cb} = qP_{Cb} + \text{QpBdOffset}_C$$

$$Qp'_{Cr} = qP_{Cr} + \text{QpBdOffset}_C$$

$$Qp'_{CbCr} = qP_{CbCr} + \text{QpBdOffset}_C \quad [\text{Equation 8}]$$

That is, according to an embodiment, the maximum QP has been expanded from 51 to 63 in the VVC standard, and signaling of the initial QP may be changed accordingly. As an example, the initial value of SliceQpY may be modified in the slice segment layer when a non-zero value of slice_qp_delta is coded. Specifically, the value of init_qp_minus26 can be modified to range from (−26+QpBdOffsetY) to +37. For example, if the size of the transform block is not a power of 4, the transform coefficient may be processed by modifying and using the QP or QP levelScale table instead of multiplying by 181/256 (or 181/128) to compensate for the implicit scaling caused by the transform process. Additionally, as an example, in the case of a transform skip block, when QP is 4, the quantization step size is 1, so the minimum allowable quantization parameter (QP) may be defined as 4.

According to one embodiment, in HEVC (and also in H.264) a fixed lookup table can be used to transform the luma quantization parameter QPY to the chroma quantization parameter QPC. On the other hand, in VVC, a more flexible luma-to-chroma QP mapping can be used. Instead of using a fixed table, the luma-to-chroma QP mapping relationship can be signaled in SPS using a flexible piecewise linear model. At this time, there may be an only limitation of the linear model that the slope of each part cannot be negative. For example, if luma QP increases, chroma QP may remain the same or increase, but may not decrease. As an example, it can be defined by the number of parts in the partial linear model, and the input (luma) and output (chroma) delta QP for each part. For example, the input range of the partially linear model may be [−QpBdOffsetY, 63], and the output range of the partially linear model may be [−QpBdOffsetC, 63]. Also, for example, the QP mapping relationship can be signaled separately for Cb, Cr and joint Cb/Cr coding or jointly signaled for the three types of residual coding.

Additionally, according to an embodiment, CU level QP adaptation may be allowed in VVC as well as HEVC. Delta QP values for luma and chroma components may be signaled separately. For example, in the case of a chroma component, allowable chroma QP offset values can be signaled in the form of offset lists in PPS, similar to HEVC. Here, the offset lists can be defined separately for Cb, Cr and joint Cb/Cr coding. For example, up to 6 offset values may be allowed for each of the Cb, Cr and joint Cb/Cr lists. At the CU level, an index may be signaled to indicate which of the offset values in the offset list is used to adjust the chroma QP for the corresponding CU.

Meanwhile, in the existing LFNST, a trade-off between coding performance and complexity had to be considered due to complexity constraints. More specifically, the technology had to be designed in such a way as to minimize the amount of computation and implementation complexity by maintaining the region of input primary transform coefficients for LFNST, the number of output transform coefficients, the number of LFNST sets, the number of LFNST kernels per set, the number of operations required to process one sample, etc. for the LFNST below a certain level.

In addition, LFNST is a coding tool newly included in the VVC standard, and quantization (dependent quantization) is also a new technology introduced in the VVC standard, so quantization technology specialized for LFNST has not yet been specifically proposed. Likewise, since the scaling list technology specialized for LFNST was not specifically designed, there was a disadvantage in that the effects related to the scaling list were not properly achieved when LFNST was applied.

However, in the next standard, the allowable complexity will increase due to the development of implementation technology, so to improve coding performance, a technology that structurally extends the existing LFNST or a quantization/scaling list technology specialized for LFNST can be considered. Based on various technologies that structurally extend LFNST or quantization/scaling list technologies specialized for LFNST, the coding performance that LFNST can bring can be maximized within the implementation complexity allowed by the next standard.

In relation to this, various embodiments related to a method of applying a quantization or scaling list when LFNST is applied are proposed below.

According to an embodiment, different QP values can be applied to each position for the transform coefficients output by applying the forward LFNST. When the transform coefficients output by applying LFNST are quantized and arranged according to the scan order (e.g. transform coefficient scan order in the VVC standard), quantization may be applied to the transform coefficients by applying different QP values depending on the position according to the scan order. For example, it may be possible to code more precisely by lowering the value of QP closer to the DC location.

In relation, more specific embodiments may be as follows.

1. If the value of QP applied to the current transform block is Q, the value of Q-A can be applied as the value of QP for the DC position (i.e., the top left position of the corresponding transform block), and the value of Q can be applied to the remaining positions.

For example, the value of A can be 1, 2, 3, 4, etc., and a predefined value (predefined in the encoding/decoding apparatus) can be used to determine what value can be applied as the value of A. Alternatively, the value of A may be signaled through a high-level syntax element (HLS element). It may be configured to directly code the value of A through the corresponding HLS element, or create a list of possible A values, assign an index value to each element in the list, and signal the corresponding index value through the corresponding HLS element.

For example, It can be configured to directly code 1, 2, 3, 4, etc. as the value of A through the corresponding HLS element. Or, for example, it can be configured to create [1, 2, 3, 4, 6, 8] as the list of possible A values, assign the index value to each element in the list, and signal the corresponding index value through the corresponding HLS element. Here, the index value can be assigned to start from 0 and increase by 1. For example, the corresponding HLS element may be located in Sequence Parameter Set (SPS), Picture Parameter Set (PPS), Picture Header (PH), Slice Header (SH), etc.

2. The location where the transform coefficients are placed in the transform block can be expressed as two-dimensional coordinates (x, y). That is, the top left DC position can be displayed as (0, 0), the x coordinate increases from left to right, and the y coordinate increases from top to bottom. At this time, for example, the value of QP can be determined based on the sum of the x-coordinate value and the y-coordinate value as to which value of QP to apply to each transform coefficient output by applying the forward LFNST.

For example, if transform coefficient coding is performed in Coefficient Group (CG) units and the corresponding CG is a 4×4 sub-block, and the number of transform coefficients output by applying forward LFNST is 16 or less, the sum of the the x-coordinate and y-coordinate for the transform coefficients placed in the top left CG can be from 0 to 6. At this time, as an example, if the sum of the x-coordinate and y-coordinate is S (0≤S≤6) and the QP offset value is As, the value of Q+As can be applied as the value of QP for quantization for the corresponding positions. Here, Q may refer to the basic value of QP applied to the corresponding transform block, as the embodiment of the item 1. For example, when the value of QP applied to the corresponding transform block is expressed in the form of Q+As, it may be $A_0=-1$, and $A_1=A_2=A_3=A_4=A_5=A_6=0$. In another example, if the value of As is expressed in tuple form, it may be $(A_0, A_1, A_2, A_3, A_4, A_5, A_6)=(-2, -1, -1, 0, 0, 0, 0)$, $(A_0, A_1, A_2, A_3, A_4, A_5, A_6)=(-1, -1, -1, -1, 0, 0, 0)$, or $(A_0, A_1, A_2, A_3, A_4, A_5, A_6)=(-2, -1, -1, 0, 0, 1, 1)$.

Relatedly, values of As may be predefined in the encoding/decoding apparatus, or the values of As may be signaled through a high-level syntax element (HLS element) as the embodiment of the item 1. For example, it may be configured to directly signal the values from $A_0$ to $A_6$ one by one through the HLS element, or create the list of possible As values, assign an index value to each element in the list, and signal the corresponding index value through the corresponding HLS element. For example, if the value of As is −2, −2 can be directly signaled, and if the value of As is 1, 1 can be directly signaled. Or, for example, it can be configured to create [−3, −2, −1, 0, 1, 2, 3] as the list of possible As values, assign the index values from 0 to 6 to each of the seven elements in the list, and signal the corresponding index value through the corresponding HLS element.

Additionally, as an example, the values of As can be displayed in the form of the tuple, such as $(A_0, A_1, A_2, A_3, A_4, A_5, A_6)$, and it may be configured to create the list of possible tuples and assing an index value for each element (tuple) in the list, and signal the corresponding index value through the corresponding HLS element. For example, it may be configured to assign index values of 0, 1, and 2 to each of the three tuples such as (−2, −1, −1, 0, 0, 0, 0), (−1, −1, −1, −1, 0, 0, 0), and (−2, −1, −1, 0, 0, 1, 1), and signal the corresponding index value through the corresponding HLS element. Likewise, the corresponding HLS element may be located in Sequence Parameter Set (SPS), Picture Parameter Set (PPS), Picture Header (PH), Slice Header (SH), etc.

3. Extending the embodiment of the item 2, if the number of transform coefficients output by applying the forward LFNST is greater than 16, transform coefficients other than the first 16 transform coefficients according to scan order can be filled starting from the second CG. At this time, from the second CGs onwards, a value of QP other than the value of QP for the current transform block may be applied.

As a more specific example, from the second CGs onwards, the value of Q+A can be applied rather than the value of Q, and the value of A can be 0, 1, 2, 3, etc. Similar to embodiments of the items 1 and 2, the value of A may be set to the predefined value in the encoding/decoding apparatus, or may be specified through the high-level syntax element (HLS element). The value of A itself may be directly signaled through the corresponding HLS element, or it can be configured to create the list of possible A values, assign an index value to each element in the list, and signal the corresponding index value through the corresponding HLS element.

As an example, as the embodiment of the item 2, from the second CGs onwards, it can be configured so that the top left DC position is indicated as (0,0) within the CG, and the x-coordinate increases from left to right and the y-coordinate increases from top to bottom within the CG. At this time, for example, if the QP offset value for the sum S of the x-coordinate value and the y-coordinate value is As, for positions where the sum of the x-coordinate and y-coordinate is S, the Q+As may be applied as the value of QP instead of the value of Q. For example, if the values of As are expressed as the tuple such as $(A_0, A_1, A_2, A_3, A_4, A_5, A_6)$, it may be (−1, 0, 0, 0, 0, 0, 0), (−1, 0, 0, 0, 1, 1, 1), (0, 0, 0, 1, 1, 1, 1) or (0, 0, 0, 0, 0, 0, 0). Likewise, the values of As may be signaled through the HLS element, and the corresponding HLS element can be located in Sequence Parameter Set (SPS), Picture Parameter Set (PPS), Picture Header (PH), Slice Header (SH), etc.

On the other hand, if LFNST index signaling, etc. are performed before signaling/parsing of transform coefficients, and whether LFNST is applied can be known before signaling/parsing of the transform coefficients, the structure of residual coding can be designed to be specialized for LFNST.

For reference, in the VVC standard, the LFNST index is signaled after all signaling/parsing of the transform coefficients is completed, so it is impossible to know whether LFNST is applied during the signaling/parsing process for the transform coefficients, and conversely, information (e.g. whether regions other than the ROI are zero-out, whether the transform coefficient exists other than the DC position, etc.) analyzed in the signaling/parsing process of the transform coefficient is used as a condition for signaling the LFNST index.

Differently, if it is possible to know in advance whether LFNST is applied or not before signaling/parsing the transform coefficients, it is possible to know in advance whether the transform coefficient currently signaling/parsing is a transform coefficient to which LFNST is applied, and thus different contexts can be assigned depending on whether LFNST is applied, and the context selection method and context allocation method can also be configured differently, for various syntax elements that make up residual coding and syntax elements related to parsing of transform coefficients. For example, when LFNST is applied, the region in which the transform coefficient can exist may be limited (for example, in the VVC standard, the transform coefficient can only exist in the maximum top-left 4×4 block region), so the region for scanning the transform coefficient can be limited to a limited region such as a 4×4 block. Additionally, as an example, if LFNST is applied when coding the last non-zero transform coefficient position, the maximum possible x-coordinate value and y-coordinate value may be limited, so the maximum value of the code length when binarized to a truncated unary code can be limited to the maximum value at which the coordinates can exist.

Meanwhile, according to an embodiment, when LFNST is applied, application of the scaling list can be set to be unconditionally disabled. Through this, the problem of excessively large buffer requirements can be solved. As a specific example, in the VVC standard, if transform skip is applied to even one color component, accordingly LFNST is not applied, LFNST may be disabled for other color components as well. However, according to this embodiment, even if transform skip is applied to one color component, LFNST can be configured to be applied to other color components to which LFNST can be applied.

As a more specific example, in the case of a single tree, if one chroma component is coded as a transform skip, LFNST may be applied and the LFNST index may be configured to be signaled for the luma component. Here, one chroma component being coded as the transform skip may correspond to a case where the value of the transform skip flag for the corresponding component is 1. Alternatively, it may also correspond to a case that BDPCM is applied for the transform block in which one or more non-zero transform coefficients exist. If a non-zero transform coefficient does not exist while BDPCM is applied, it can be considered that the transform skip is not applied.

As another specific example, in the case of a dual tree (separate tree) for chroma components, if one chroma component is coded as the transform skip, LFNST may be applied and the LFNST index may be configured to be signaled for the other chroma component.

On the other hand, even if the LFNST index is signaled after signaling/parsing of the transform coefficients to determine whether LFNST is applied, the number of transform coefficients to which LFNST is applied may not be large. For reference, in the case of the VVC standard, up to 16 LFNST transform coefficients can be generated due to zero-out of the primary transform coefficients.

In relation to this, according to an embodiment, it may be configured that only the LFNST transform coefficient may be additionally stored and whether to use the stored LFNST transform coefficient at the point in time whether or not to apply the LFNST is known may be determined.

As a more specific example, the scaling list can be applied to the transform coefficient that is currently signaled/parsed, and transform coefficient values to which the scaling list is not applied can be separately stored for a limited number of transform coefficients to which LFNST may be applied. Afterwards, when it is known whether or not LFNST is applied to the corresponding transform coefficients by parsing the LFNST index, it can be selected between the value to which the scaling list is applied and the stored value to which the scaling list is not applied based on whether or not LFNST is applied.

According to an embodiment, when LFNST is applied, a separate scaling list can be applied.

As an example, the scaling list can be configured according to the position where the LFNST transform coefficient exists (in the case of the VVC standard, from the DC position to up to the 16th position depending on the scan order). That is, the scaling list can be configured to have different weight values depending on the location. As another example, similar to the existing scaling list, a separate scaling list may be configured according to the size of the transform block to which LFNST is applied. For example, separate scaling lists can be applied to the block size to which LFNST_4×4 is applied and to the block size to which LFNST_8×8 is applied. As another example, a different scaling list may be configured for each LFNST kernel candidate. For example, when one LFNST set consists of two candidates, a separate scaling list may be applied for each case where the first candidate is selected and the second candidate is selected based on the LFNST index value. Alternatively, as an example, a separate scaling list may be applied for each case based on some or all of the three factors described above: the location where the LFNST transform coefficient exists, the transform block size to which LFNST is applied, and the LFNST kernel candidate.

The following figures are made to explain a specific example of the present disclosure. Since the names of specific appratus or names of specific signals/messages/fields described in the figures are provided as examples, the technical features of the present disclosure are not limited to the specific names used in the figures below.

Figure 7:
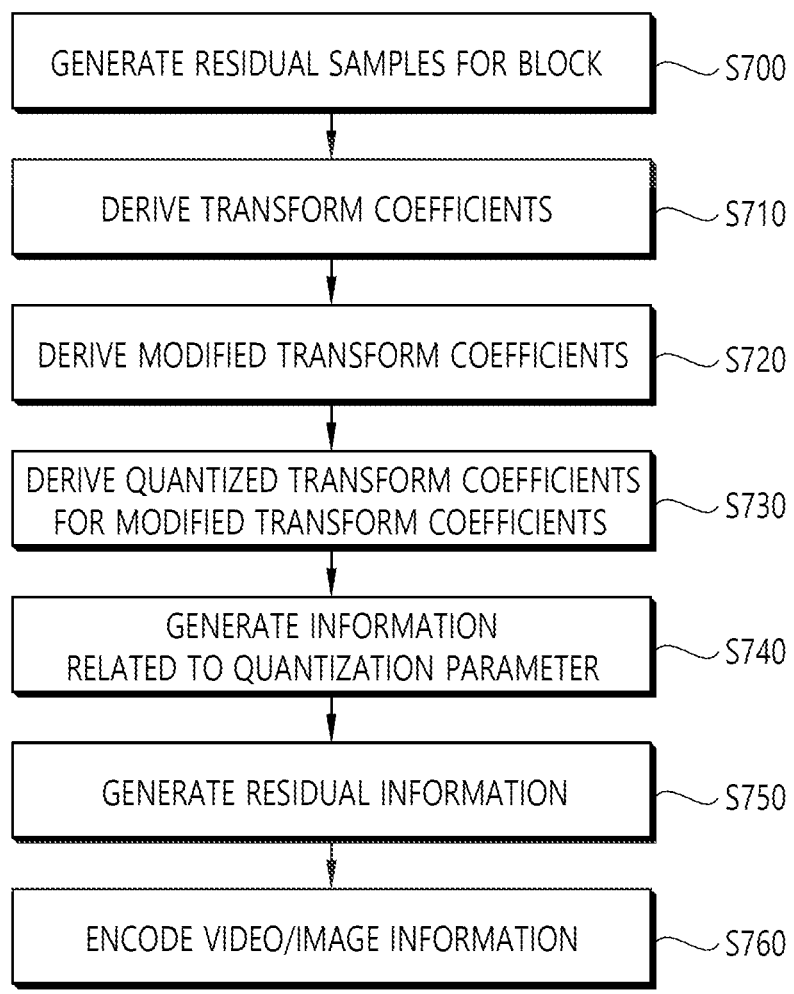
FIG. 7 schematically illustrates an example of a video/image encoding method according to embodiments of the present disclosure.

FIG. 7 schematically illustrates an example of a video/image encoding method according to embodiments of the present disclosure.

The method disclosed in FIG. 7 may be performed by the encoding apparatus disclosed in FIG. 2. Specifically, for example, S700 to S750 of FIG. 7 may be performed by the residual processor 230 of the encoding appratus 200 of FIG. 2, and S760 of FIG. 7 may be performed by the entropy encoder 240 of the encoding apparatus 200 of FIG. 2. The method disclosed in FIG. 7 may include the embodiments described above in this disclosure.

Referring to FIG. 7, the encoding apparatus 200 generates residual samples for a block (S700). For example, the encoding apparatus 200 may generate residual samples for the current block. For example, the encoding apparatus 200 may generate residual samples through procedures such as partitioning and intra/inter prediction on the input original picture, as described above with reference to FIG. 2. Specifically, the encoding apparatus 200 may generate prediction samples for the current block through intra prediction or inter prediction and generate residual samples based on the prediction samples.

For example, the encoding apparatus 200 may determine whether to perform inter prediction or intra prediction on the current block based on the RD cost. Additionally, the encoding apparatus 200 may perform prediction according to the determined prediction mode to derive prediction samples for the current block. At this time, various prediction methods disclosed in this disclosure, such as inter prediction or intra prediction, can be applied. Additionally, the encoding apparatus 200 may derive residual samples by comparing original samples and prediction samples for the current block.

The encoding apparatus 200 derives transform coefficients (S710). For example, the encoding apparatus 200 may derive the transform coefficients based on the residual samples. For example, the encoding apparatus 200 may derive the transform coefficients for the current block by performing a primary transform on the residual samples. For example, a reduced transform may be applied to the primary transform, or a normal separable transform may be applied. Additionally, the primary transform may be based on multiple core transforms based on a plurality of transform kernels selected from DCT-2, DCT-7, DCT-8, and DST-1.

The encoding apparatus 200 derives modified transform coefficients (S720). For example, the encoding apparatus 200 may apply LFNST to the transform coefficients to derive the modified transform coefficients. For example, the encoding apparatus 200 may derive the modified transform coefficients by applying LFNST to the transform coefficients based on the LFNST matrix. For example, LFNST may be a secondary transform and may include a non-separable secondary transform in which RST is reflected. At this time, the LFNST matrix applied to the secondary transform may be a non-square matrix in which the number of rows is less than the number of columns.

Meanwhile, when the transform is not applied to the residual samples, the encoding apparatus 200 may derive the residual samples as the modified transform coefficients without performing S710. In this case, the encoding apparatus 200 may generate and encode transform skip flag information based on whether the transform is applied to the current block. The transform skip flag information may be information indicating whether the transform is applied or skipped for the current block.

The encoding apparatus 200 derives quantized transform coefficients for the modified transform coefficients (S730). For example, the encoding apparatus 200 may derive the quantized transform coefficients for the modified transform coefficients based on the modified transform coefficients and the quantization parameter. For example, the encoding apparatus 200 may perform quantization on the modified transform coefficients based on the quantization parameter, thereby deriving the quantized transform coefficients for the modified transform coefficients.

For example, in performing the quantization on the modified transform coefficients, the encoding apparatus 200 may apply a frequency weighting quantization that adjusts the quantization strength according to the frequency. In this case, the quantization process may be further performed based on the quantization scale value for each frequency. The quantization scale value for the frequency weighting quantization can be derived using a scaling matrix. For example, the encoding apparatus 200 may use a predefined scaling matrix, encode frequency quantization scale information for the scaling matrix to signal to the decoding apparatus 300. The frequency quantization scale information may include scaling list data. The (modified) scaling matrix can be derived based on the scaling list data.

Additionally, the encoding apparatus 200 may perform inverse quantization in the same way as the decoding apparatus 300. In this case, the encoding apparatus 200 may derive the (modified) scaling matrix based on the scaling list data and apply the inverse quantization to the quantized transform coefficients based on the (modified) scaling matrix to derive reconstructed transform coefficients. At this time, the reconstructed transform coefficients may be different from the original transform coefficients due to loss in the transform/quantization process.

Here, the scaling matrix may refer to the above-described frequency-based quantization scaling matrix, and may be used interchangeably or replaced with the quantization scaling matrix, the quantization matrix, the scaling matrix, the scaling list, etc. for convenience of description, and it is not limited to the specific name used in this embodiment.

Meanwhile, according to an embodiment, the quantization parameter value for the modified transform coefficients may be determined based on whether LFNST is applied to the current block. That is, based on whether LFNST is applied to the current block, the quantization parameter applied to each of the modified transform coefficients may be related to the position of each of the modified transform coefficients within the current block.

According to an embodiment, based on LFNST being applied to the current block, the quantization parameter for the modified transform coefficient present at the DC position in the current block has the smallest value among the quantization parameters applied to the modified transform coefficients in the current block.

According to an embodiment, among the modified transform coefficients in the current block, the quantization parameter for the modified transform coefficient present at the DC position has the value of Q-A, and quantization parameters for remaining modified transform coefficients have the value of Q.

According to an embodiment, based on that coordinates of the DC position in the current block are (0, 0), an x-coordinate increases from left to right, and an y-coordinate increases from top to bottom, coordinates of positions of the modified transform coefficients in the current block are (x,y). At this time, the quantization parameters for the modified transform coefficients in the current block have the value of Q+As. In addition, the value of As is determined based on the value of x+y.

As an example, the value of As is −1 based on the case where the value of x+y is 0, and the value of As is 0 based on the case where the value of x+y is not 0.

As another example, the value of As is −2 based on the case where the value of x+y is 0, the value of As is −1 based on the case where the value of x+y is 1 or 2, and the value of As is 0 based on the case where the value of x+y is not one of 0, 1 or 2.

According to an embodiment, based on LFNST being applied to the current block, the scaling list may not be applied to the current block. That is, for example, based on LFNST being applied to the current block, the transform coefficients for the current block can be derived without applying the scaling list.

According to an embodiment, based on LFNST being not applied to the current block, the first scaling list may be applied to the current block. Additionally, based on LFNST being applied to the current block, the second scaling list may be applied to the current block. At this time, the first scaling list and the second scaling list may be different.

As an example, the second scaling list may be configured based on at least one of positions where LFNST transform coefficients exist in the current block, the size of the current block, or the LFNST kernel. For example, the number of LFNST transform coefficients in the current block may be m, and m may be determined based on the block size and/or LFNST size. For example, m can be up to 16.

The encoding apparatus 200 generates information related to a quantization parameter (S740).

For example, the information related to the quantization parameter may include information related to the value of A. For example, information related to the value of A may be included in at least one of SPS, PPS, PH, or SH.

For example, the information related to the quantization parameter may include information related to the value of As. At this time, information related to the value of As may be included in at least one of SPS, PPS, PH, or SH.

For example, the information related to the quantization parameter may include information related to the scaling list.

The encoding apparatus 200 generates residual information (S750). For example, the encoding apparatus 200 may generate the residual information based on the quantized transform coefficients. For example, the residual information may include the above-described transform-related information/syntax elements such as value information of quantized transform coefficients, position information, transform technique, and transform kernel. As an example, the residual information may include information related to LFNST. The information related to the LFNST may include at least one piece of information about whether LFNST is applied, information about the minimum transform size to which LFNST is applied, information about the maximum transform size to which LFNST is applied, and transform index information indicating one of the transform kernels included in the transform set. These information may be included in SPS, PPS, PH or SH.

The encoding apparatus 200 encodes video/image information (S760). For example, the video/image information may include the residual information and the information related to the quantization parameter. Additionally, the video/image information may include various information according to embodiments of this disclosure. For example, the video/image information may include the information disclosed in at least one of Tables 3 to 8 described above. Additionally, the video/image information may include information for picture reconstruction. The information for picture reconstruction may include information related to prediction, information related to transform, etc.

Encoded video/image information may be output in bitstream form. The bitstream may be transmitted to the decoding apparatus through a network or storage medium.

Figure 8:
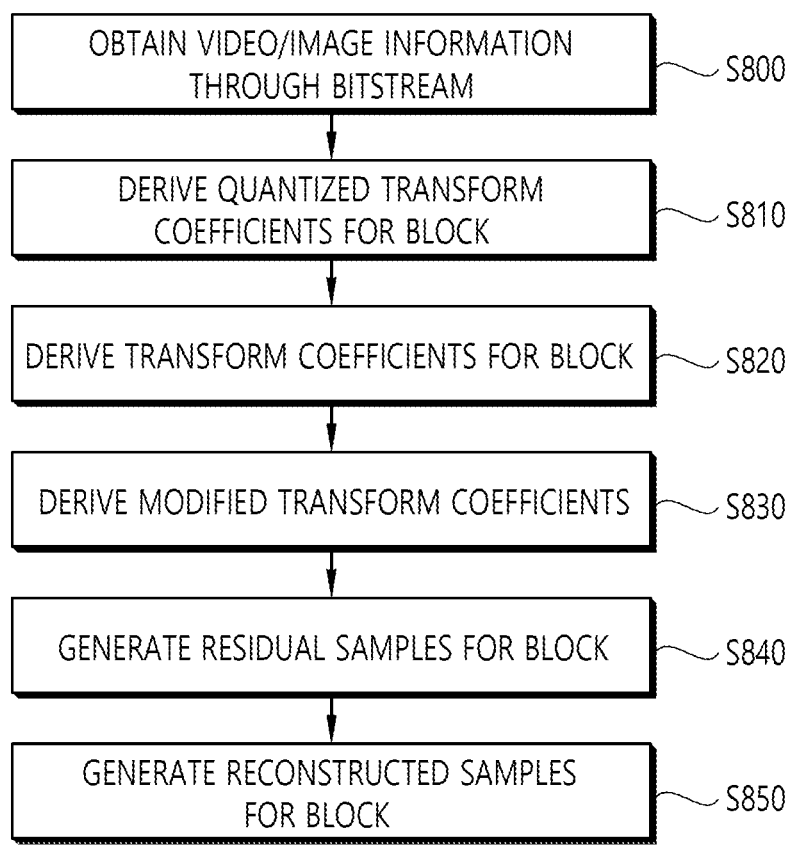
FIG. 8 schematically illustrates an example of a video/image decoding method according to an embodiment of the present disclosure.

FIG. 8 schematically illustrates an example of a video/image decoding method according to an embodiment of the present disclosure.

The method disclosed in FIG. 8 can be performed by the decoding apparatus disclosed in FIG. 3. Specifically, for example, S800 of FIG. 8 may be performed by the entropy decoder 310 of the decoding apparatus 300, and S810 to S840 may be performed by the residual processor 320 of the decoding apparatus 300. S850 may be performed by the adder 340. The method disclosed in FIG. 8 may include the embodiments described above in this disclosure.

Referring to FIG. 8, the decoding apparatus 300 receives/obtains video/image information through a bitstream (S800). For example, the decoding apparatus 300 may parse the bitstream to derive information (e.g. video/picture information) necessary for image reconstruction (or picture reconstruction). The video/image information may include various information required in the decoding process and may be decoded based on a coding method such as exponential Golomb coding, CAVLC, or CABAC.

The video/image information may include the residual information and the information related to the quantization parameter. Additionally, the video/image information may include various information according to embodiments of this disclosure. For example, the video/image information may include the information disclosed in at least one of Tables 3 to 8 described above. Additionally, the video/image information may include information for picture reconstruction. The information for picture reconstruction may include information related to prediction, information related to transform, etc.

As an example, the residual information may include the above-described transform-related information/syntax elements such as value information of quantized transform coefficients, position information, transform technique information, and transform kernel information. As an example, the residual information may include information related to LFNST. The information related to the LFNST may include at least one piece of information about whether LFNST is applied, information about the minimum transform size to which LFNST is applied, information about the maximum transform size to which LFNST is applied, and transform index information indicating one of the transform kernels included in the transform set. These information may be included in SPS, PPS, PH or SH.

For example, the information related to the quantization parameter may include information related to the value of A. For example, information related to the value of A may be included in at least one of SPS, PPS, PH, or SH.

For example, the information related to the quantization parameter may include information related to the value of As. At this time, information related to the value of As may be included in at least one of SPS, PPS, PH, or SH.

For example, the information related to the quantization parameter may include information related to the scaling list.

The decoding apparatus 300 derives the quantized transform coefficients for the block (S810). For example, the decoding apparatus 300 may derive the quantized transform coefficients for the current block based on the residual information. For example, the decoding apparatus 300 may obtain the residual information included in the image information. As described above, the residual information may include the value information of the quantized transform coefficients, the position information, the transform technique information, and the transform kernel information. The decoding apparatus 300 may derive the quantized transform coefficients for the current block based on quantized transform coefficient information included in the residual information.

The decoding apparatus 300 derives the transform coefficients for the block (S820). For example, the decoding apparatus 300 may derive the transform coefficients for the current block based on the quantized transform coefficients and the information related to the quantization parameter. For example, the decoding apparatus 300 may derive the transform coefficients for the current block by performing inverse quantization on the quantized transform coefficients based on the quantization parameter derived from information related to the quantization parameter.

For example, in performing inverse quantization on the quantized transform coefficients, the decoding apparatus 300 may apply the frequency weighting quantization that adjusts the quantization strength according to the frequency. In this case, the inverse quantization process may be further performed based on the quantization scale value for each frequency. The quantization scale values for the frequency weighting quantization can be derived using the scaling matrix. For example, the decoding apparatus 300 may use the predefined scaling matrix or use the frequency quantization scale information for the scaling matrix signaled from the encoding apparatus. The frequency quantization scale information may include scaling list data. The (modified) scaling matrix can be derived based on the scaling list data.

That is, the decoding apparatus 300 may further apply the frequency weighting quantization in performing the inverse quantization process. At this time, the decoding apparatus may derive the transform coefficients by applying inverse quantization to the quantized transform coefficients based on scaling list data.

Meanwhile, according to an embodiment, quantization parameter value for the quantized transform coefficients may be determined based on whether LFNST is applied to the current block. That is, the quantization parameter applied to each of the quantized transform coefficients based on whether LFNST is applied to the current block may be related to the position of each of the quantized transform coefficients within the current block.

According to an embodiment, based on the LFNST being applied to the current block, the quantization parameter for the quantized transform coefficient present at the DC position in the current block has the smallest value among the quantization paratmeters applied to the quantized transform coefficients in the current block.

According to an embodiment, among the quantized transform coefficients in the current block, the quantization parameter for the quantized transform coefficient present at the DC position has the value of Q-A, and quantization parameters for remaining quantized transform coefficients have the value of Q.

According to an embodiment, based on that coordinates of the DC position in the current block are (0, 0), an x-coordinate increases from left to right, and an y-coordinate increases from top to bottom, coordinates of positions of the quantized transform coefficients in the current block are (x,y). At this time, the quantization parameters for the quantized transform coefficients in the current block have the value of Q+As. In addition, the value of As is determined based on the value of x+y.

As an example, the value of As is −1 based on the case where the value of x+y is 0, and the value of As is 0 based on the case where the value of x+y is not 0.

As another example, the value of As is −2 based on the case where the value of x+y is 0, the value of As is −1 based on the case where the value of x+y is 1 or 2, and the value of As is 0 based on the case where the value of x+y is not one of 0, 1 or 2.

According to an embodiment, based on LFNST being applied to the current block, the scaling list may not be applied to the current block.

According to an embodiment, based on LFNST being not applied to the current block, the first scaling list may be applied to the current block to derive the transform coefficients. Additionally, based on LFNST being applied to the current block, the second scaling list may be applied to the current block to derive the transform coefficients. At this time, the first scaling list and the second scaling list may be different.

As an example, the second scaling list may be configured based on at least one of positions where LFNST transform coefficients exist in the current block, the size of the current block, or the LFNST kernel. For example, the number of LFNST transform coefficients in the current block may be m, and m may be determined based on the block size and/or LFNST size. For example, m can be up to 16.

The decoding apparatus 300 derives the modified transform coefficients (S830). For example, the decoding apparatus 300 may derive the modified transform coefficients by applying LFNST based on the transform coefficients. As an example, the decoding device 300 may derive modified transform coefficients by applying LFNST to the transform coefficients based on the LFNST matrix. For example, the LFNST may be an inverse secondary transform and may include a non-separable secondary transform reflecting RST. At this time, the LFNST matrix applied to the inverse secondary transform may be a non-square matrix in which the number of columns is less than the number of rows.

The decoding apparatus 300 generates the residual samples for the block (S840). For example, the decoding apparatus 300 may generate the residual samples for the current block based on the modified transform coefficients. For example, the decoding apparatus 300 may generate the residual samples for the current block by performing primary transform on the modified transform coefficients. At this time, the primary transform may be an inverse primary transform. For example, a reduced inverse transform may be applied to the primary transform, or a normal separable transform may be applied. Additionally, the primary transform may be based on multiple core transforms based on a plurality of transform kernels selected from DCT-2, DCT-7, DCT-8, and DST-1.

Meanwhile, the decoding apparatus 300 may obtain information indicating whether to apply inverse transform to the current block (i.e., transform skip flag information), and derive the residual samples based on this information (i.e., transform skip flag information).

For example, when inverse transform is not applied to the transform coefficients (when the value of the transform skip flag information for the current block is 1), the decoding apparatus 300 may not perform S820 and derive the transform coefficients as the residual samples of the current block. Alternatively, when inverse transform is applied to the transform coefficients (when the value of the transform skip flag information for the current block is 0), the decoding apparatus 300 may perform inverse transform on the transform coefficients to derive the residual samples of the current block.

The decoding apparatus 300 generates the reconstructed samples for the block (S850). For example, the decoding apparatus 300 may generate the reconstructed samples for the current block based on the residual samples.

As an example, the decoding apparatus 300 may determine whether to perform inter prediction or intra prediction for the current block based on prediction information (e.g., prediction mode information) included in the image information, and may derive the prediction samples for the current block by performing prediction according to the above determination. Additionally, the decoding apparatus may generate reconstructed samples based on the prediction samples and the residual samples. At this time, the decoding apparatus may directly use the prediction samples as reconstructed samples depending on the prediction mode, or may generate reconstructed samples by adding the residual samples to the prediction samples. Additionally, a reconstructed block or reconstructed picture can be derived based on the reconstructed samples.

Additionally, the decoding apparatus 300 may generate a modified reconstructed picture by applying an in-loop filtering method such as deblocking filtering and/or SAO to improve the subjective/objective picture quality of the reconstructed picture as needed. The modified reconstructed picture may be stored as a decoded picture in the output and/or decoded picture buffer or memory 360, and may be used as a reference picture in the inter prediction procedure when decoding a subsequent picture.

In the above-described embodiment, the methods are described based on the flowchart having a series of steps or blocks, but this embodiment is not limited to the order of the above steps or blocks and some steps may occur simultaneously or in a different order from other steps as described above. Further, those skilled in the art will understand that the steps shown in the above flowchart are not exclusive, that further steps may be included, or that one or more steps in the flowchart may be deleted without affecting the scope of the embodiments of the present disclosure.

The method according to the embodiments of the present disclosure described above may be implemented in software. The encoding apparatus and/or decoding apparatus according to the present disclosure may be included in a device that performs image processing, for example, a TV, a computer, a smartphone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device. That is, the embodiments described in the present disclosure may be implemented and performed on a processor, a microprocessor, a controller, or a chip. For example, the functional units shown in each drawing may be implemented and executed on a computer, a processor, a microprocessor, a controller, or a chip. In this case, information (ex. Information on instructions) for implementation or an algorithm may be stored in a digital storage medium.

In addition, the decoding apparatus and the encoding apparatus to which the embodiments of the present disclosure are applied may be applied to multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VOD) service provision device, an OTT video (Over the top video), an Internet streamlining service providing device, a 3D video device, a virtual reality (VR) device, an augmented reality (AR) device, a video call device, a transportation means terminal (e.g., vehicle (including autonomous vehicle) terminal, airplane terminal, ship terminal, etc.) and may be used to process video signals or data signals. For example, the OTT video (over the top video) device may include a game console, a Blu-ray player, an Internet access TV, a home theater system, a smartphone, a tablet PC, a digital video recorder (DVR).

Further, the processing method to which the embodiments of the present disclosure are applied may be produced in the form of a computer-executed program, and may be stored in a computer-readable recording medium. The multimedia data having the data structure according to the embodiment(s) of the present disclosure may also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-ROM, magnetic tape, floppy disk, and optical data storage devices. In addition, the computer-readable recording medium includes media implemented in the form of a carrier wave (for example, transmission over the Internet). In addition, the bit stream generated by the encoding method may be stored in a computer-readable recording medium or transmitted over a wired or wireless communication network.

Further, an embodiment(s) of the present disclosure may be implemented as a computer program product by program code, and the program code may be executed in a computer according to an embodiment(s) of the present disclosure. The program code may be stored on a carrier readable by a computer.

Figure 9:
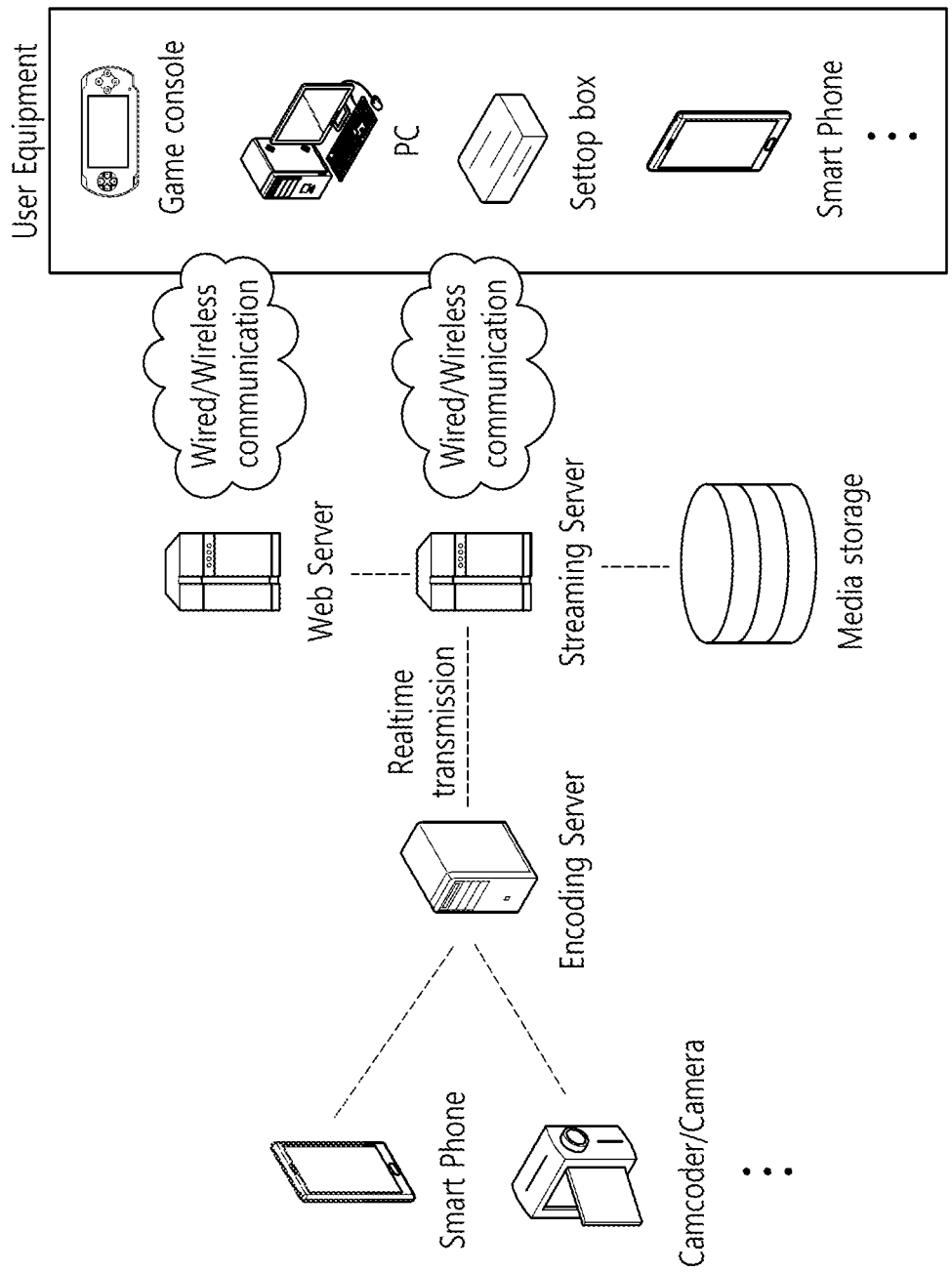
FIG. 9 illustrates an example of a content streaming system to which the embodiments disclosed in this disclosure can be applied.

FIG. 9 is a diagram illustrating a structure of a content streaming system to which the embodiments of the present disclosure are applied.

Referring to FIG. 9, the content streaming system to which the embodiments of the present disclosure are applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted.

The bitstream may be generated by the encoding method to which the embodiments of the present disclosure are applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smart watch, a smart glass, a head mounted display (HMD)), a digital TV, a desktop computer, a digital signage, or the like.

The respective servers within the content streaming system may be operated by a distribution server, and in this case, the data received by each server may be distributed and processed.

Claims described in the present specification may be combined in various methods. For example, the technical features of method claims of the present specification may be combined and implemented as a device, and the technical features of device claims of the present specification may be combined and implemented as a method. Further, the technical features of the method claims of the present specification and the technical features of the device claims thereof may be combined and implemented as a device, and the technical features of the method claims of the present specification and the technical features of the device claims thereof may be combined and implemented as a method.

What is claimed is:

1. An image decoding method performed by a decoding apparatus, the method comprising:
    obtaining image information through a bitstream, wherein the image information includes residual information and information related to a quantization parameter;
    deriving quantized transform coefficients for a current block based on the residual information;
    deriving transform coefficients for the current block based on the quantized transform coefficients and the information related to the quantization parameter;
    deriving modified transform coefficients by applying a low-frequency non-separable transform (LFNST) based on the transform coefficients;
    generating residual samples for the current block based on the modified transform coefficients; and
    generating reconstructed samples for the current block based on the residual samples,
    wherein based on the LFNST being applied to the current block, a quantization parameter for a quantized transform coefficient present at a DC position in the current block has a smallest value among quantization parameters applied to the quantized transform coefficients in the current block, and
    wherein each of the quantization parameters for the quantized transform coefficients in the current block is based on a sum of a relative x coordinate which is defined in relation to the DC position and a relative y coordinate which is defined in relation to the DC position.

2. The image decoding method of claim 1,
    wherein the relative x coordinates and the relative y coordinates of positions of the quantized transform coefficients in the current block are (x,y) based on that coordinates of the DC position in the current block are (0, 0), an x-coordinate increases from left to right, and an y-coordinate increases from top to bottom, and wherein the value of As is determined based on a value of x+y.

3. The image decoding method of claim 1,
    wherein the value of As is −1 based on a case where the value of x+y is 0, and
    wherein the value of As is 0 based on a case where the value of x+y is not 0.

4. The image decoding method of claim 1,
    wherein the value of As is −2 based on a case where the value of x+y is 0,
    wherein the value of As is −1 based on a case where the value of x+y is 1 or 2,
    wherein the value of As is 0 based on a case where the value of x+y is not one of 0, 1 or 2.

5. The image decoding method of claim 1,
    wherein the information related to the quantization parameter includes information related to a value of As, and
    wherein the information related to the value of As is included in at least one of a sequence parameter set (SPS), a picture parameter set (PPS), a picture header (PH), or a slice header (SH).

6. The image decoding method of claim 1,
    wherein the information related to the quantization parameter includes information related to a scaling list, and
    wherein based on the LFNST being applied to the current block, the scaling list is not applied to the current block.

7. The image decoding method of claim 1,
    wherein based on the LFNST being not applied to the current block, a first scaling list is applied to the quantized transform coefficients to derive the transform coefficients,
    wherein based on the LFNST being applied to the current block, a second scaling list is applied to the quantized transform coefficients to derive the transform coefficients, and
    wherein the first scaling list and the second scaling list are different.

8. The image decoding method of claim 7,
    wherein the second scaling list is configured based on at least one of positions where LFNST transform coefficients exist in the current block, a size of the current block, or an LFNST kernel.

9. An image encoding method performed by an encoding apparatus, the method comprising:
    generating residual samples for a current block;
    deriving transform coefficients based on the residual samples;
    deriving modified transform coefficients by applying an low-frequency non-separable transform (LFNST) to the transform coefficients;
    deriving quantized transform coefficients for the modified transform coefficients based on the modified transform coefficients and a quantization parameter;
    generating information related to the quantization parameter;
    generating residual information based on the quantized transform coefficients; and
    encoding image information including the residual information and the information related to the quantization parameter,
    wherein based on the LFNST being applied to the current block, a quantization parameter for a modified transform coefficient present at a DC position in the current block has a smallest value among quantization parameters applied to the modified transform coefficients in the current block, and wherein each of the quantization parameters for the quantized transform coefficients in the current block is based on a sum of a relative x coordinate which is defined in relation to the DC position and a relative y coordinate which is defined in relation to the DC position.

10. The image encoding method of claim 9, wherein the relative x coordinates and the relative y coordinates of positions of the quantized transform coefficients in the current block are (x,y) based on that coordinates of the DC position in the current block are (0, 0), an x-coordinate increases from left to right, and an y-coordinate increases from top to bottom, and wherein the value of As is determined based on a value of x+y.

11. A transmission method of data for an image, the method comprising:

obtaining a bitstream for the image, wherein the bitstream is generated based on generating residual samples for a current block, deriving transform coefficients based on the residual samples, deriving modified transform coefficients by applying an low-frequency non-separable transform (LFNST) to the transform coefficients, deriving quantized transform coefficients for the modified transform coefficients based on the modified transform coefficients and a quantization parameter, generating information related to the quantization parameter, generating residual information based on the quantized transform coefficients, and encoding image information including the residual information and the information related to the quantization parameter; and transmitting the data comprising the bitstream, wherein based on the LFNST being applied to the current block, a quantization parameter for a modified transform coefficient present at a DC position in the current block has a smallest value among quantization parameters applied to the modified transform coefficients in the current block, and wherein each of the quantization parameters for the quantized transform coefficients in the current block is based a sum of a relative x coordinate which is defined in relation to the DC position and a relative y coordinate which is defined in relation to the DC position.

* * * * *